(12) United States Patent
Scherzinger et al.

(10) Patent No.: US 8,210,460 B2
(45) Date of Patent: *Jul. 3, 2012

(54) SEAT BELT TENSIONER

(75) Inventors: Walter Scherzinger, Ulm (DE); Roland Schnabl, Ulm (DE); Thomas Schwer, Illertissen (DE)

(73) Assignee: Takata Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/279,453

(22) Filed: Apr. 12, 2006

(65) Prior Publication Data

US 2006/0249612 A1 Nov. 9, 2006

(30) Foreign Application Priority Data

Mar. 9, 2004 (DE) .......................... 10 2004 012 166

(51) Int. Cl.
*B60R 22/34* (2006.01)
*B60R 22/46* (2006.01)

(52) U.S. Cl. ..................... 242/390.8; 242/374; 242/382

(58) Field of Classification Search .................. 242/374, 242/381, 382, 385, 385.1, 385.3; 280/806, 280/807, 808; 297/474, 476, 480; 192/45, 192/45.1, 46, 55.1, 56.5, 56.51; 464/30, 464/37; 475/296, 302, 318

See application file for complete search history.

(56) References Cited

U.S. PATENT DOCUMENTS

| 1,548,427 A * | 8/1925 | Aldeen ........................ 192/56.51 |
| 1,705,047 A * | 3/1929 | Ermold ......................... 192/56.5 |
| 2,100,562 A * | 11/1937 | Lippold ....................... 192/56.51 |
| 2,570,585 A * | 10/1951 | Murphy ........................ 192/56.5 |
| 2,753,030 A * | 7/1956 | Wight ......................... 192/103 R |
| 4,605,180 A * | 8/1986 | Fisher et al. ................ 242/384.2 |
| 4,750,685 A * | 6/1988 | Frei ................................ 242/374 |
| 5,794,875 A | 8/1998 | Schmid |
| 6,364,236 B1 | 4/2002 | Foehl |
| 6,405,959 B1 * | 6/2002 | Klingauf et al. ............... 242/374 |
| 6,857,594 B2 * | 2/2005 | Mori et al. ..................... 242/374 |
| 7,108,284 B2 * | 9/2006 | Mori et al. ..................... 280/806 |
| 2001/0030255 A1 | 10/2001 | Peter |
| 2001/0032902 A1 | 10/2001 | Specht |
| 2002/0024211 A1 * | 2/2002 | Yano et al. ..................... 280/806 |
| 2002/0084646 A1 | 7/2002 | Klingauf et al. |
| 2003/0116669 A1 | 6/2003 | Fujii et al. |

FOREIGN PATENT DOCUMENTS

DE 195 13 724 A1 10/1996

(Continued)

*Primary Examiner* — Michael Mansen
*Assistant Examiner* — Scott Haugland
(74) *Attorney, Agent, or Firm* — Foley & Lardner LLP

(57) ABSTRACT

The disclosed seat belt tensioner for a seat belt system may comprise a seat belt spindle, a gearwheel connected to the seat belt spindle, and a latching pawl for locking the seat belt spindle in the tensioned position by engaging in the teeth of the gearwheel. The latching pawl may be configured to be brought into a first pawl position for blocking the gearwheel in the seat belt unrolling direction and into a second pawl position for blocking the gearwheel in the seat belt-tensioning direction of rotation. The latching pawl may also be configured to perform a first pivot-over operation from the first pawl position into the second pawl position and to perform a second pivot-over operation from the second pawl position into the first pawl position when the gearwheel exerts a force on the latching pawl that exceeds a predetermined force required for the respective pivoting-over operation.

20 Claims, 15 Drawing Sheets

FOREIGN PATENT DOCUMENTS

| | | |
|---|---|---|
| DE | 197 31 689 A1 | 2/1999 |
| DE | 199 27 731 A1 | 12/2000 |
| DE | 100 18 972 A1 | 10/2001 |
| DE | 100 20 245 A1 | 11/2001 |
| DE | 100 25 031 A1 | 11/2001 |
| DE | 202 07 786 U1 | 11/2002 |
| DE | 202 17 804 U1 | 5/2003 |
| EP | 1 211 147 A2 | 6/2002 |
| EP | 1 219 510 A2 | 7/2002 |
| EP | 1 225 105 A2 | 7/2002 |
| EP | 1 498 326 A1 | 1/2005 |
| EP | 1 524 159 A1 | 4/2005 |
| WO | WO 00/71394 A1 | 11/2000 |
| WO | WO 02/46005 A1 | 6/2002 |
| WO | WO 02/49886 A1 | 6/2002 |
| WO | WO 02/49887 A1 | 6/2002 |

* cited by examiner

US 8,210,460 B2

SEAT BELT TENSIONER

BACKGROUND

The invention relates to a seat belt tensioner with a latching pawl which, after the end of a tensioning operation, locks a seat belt spindle of a seat belt system in the tensioned position by engaging in the teeth of a gearwheel connected to the seat belt spindle.

A seat belt tensioner of this type is disclosed in international PCT application publication WO 02/046005 A1, published Jun. 12, 2002 and incorporated by reference herein. This seat belt tensioner has a blocking device with a latching pawl, which is activated by means of an activating device. The activation takes place in such a manner that, after the end of a seat belt-tensioning operation, the latching pawl blocks the seat belt spindle of the seat belt system in the tensioned position by having the latching pawl engage in the teeth of a gearwheel that is connected to the seat belt spindle. To release the latching pawl, the gearwheel is first operated in the seat belt-tensioning direction of rotation so that the latching pawl can disengaged from the gearwheel. The latching pawl is subsequently pivoted away from the gearwheel.

SUMMARY

The present application is based on the object of specifying a seat belt tensioner, which can be manufactured cost-effectively and ensures a high comfort of use for the vehicle occupant.

According to the present application, this object is achieved by starting with a seat belt tensioner of the type indicated above and adding, for example, the feature of a latching pawl configured in such a manner that it can be brought into a first pawl position and into a second pawl position.

It is to be understood that both the foregoing general description and the following detailed descriptions are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
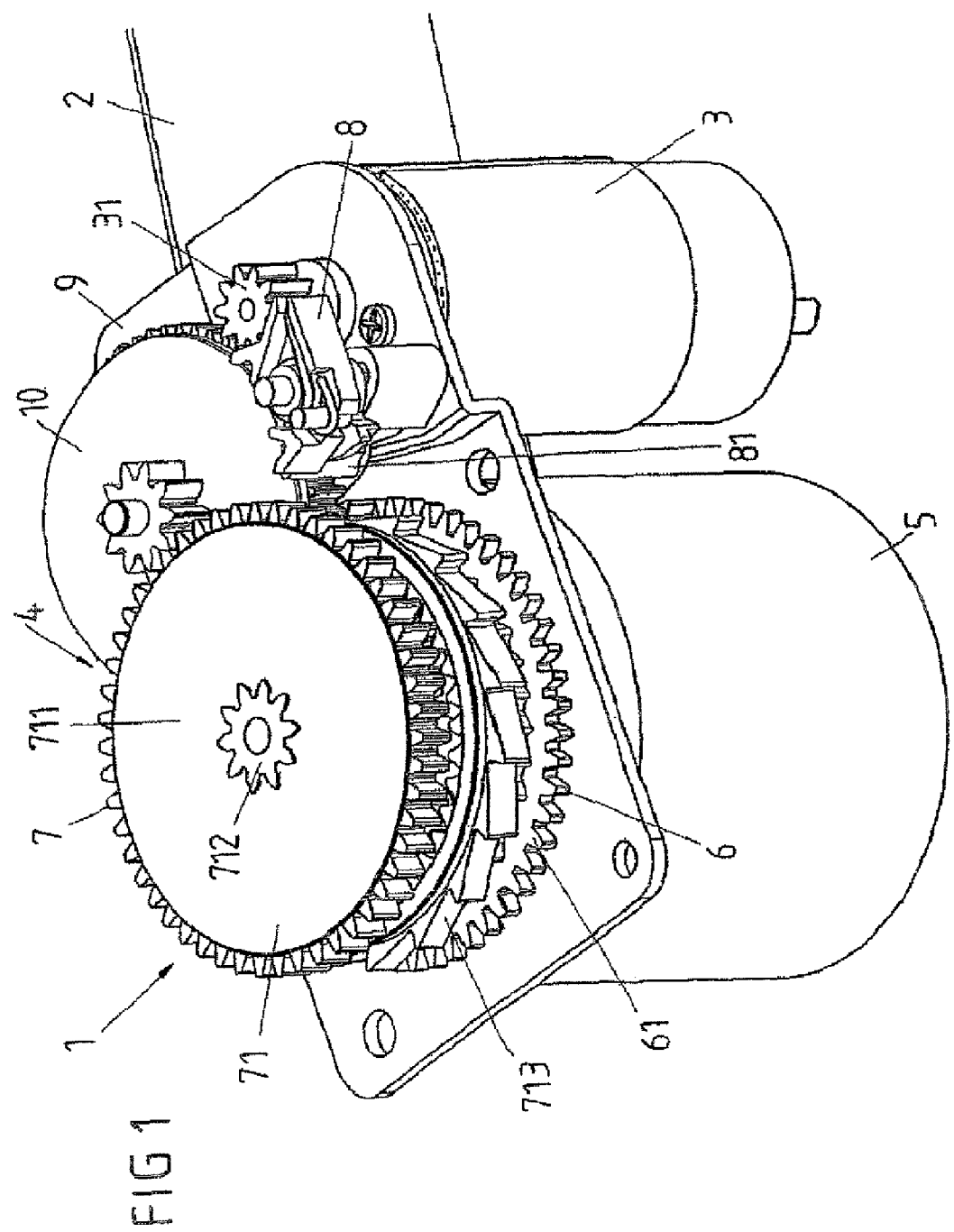
FIG. 1 is a perspective view of a seat belt tensioner according to an embodiment of the present invention.

As disclosed herein, the latching pawl can be designed so that it can be brought into a first pawl position and into a second pawl position. In its first pawl position, the latching pawl blocks the gearwheel in the seat belt-unrolling direction while, in its second pawl position, the latching pawl blocks the gearwheel in the seat belt-tensioning direction of rotation. The latching pawl may be mounted, preferably in a spring-loaded manner, such that it is pivoted over from the first pawl position into the second pawl position and vice versa when the gearwheel exerts a force on the latching pawl that exceeds a pivoting-over force required for the respective pivoting-over process.

One advantage of the seat belt tensioner according to the application can be found in the fact that the tensioner manages without an additional activating device connected to the latching pawl, i.e., without an additional actuator, because the switching "on" and "off" of the latching pawl can be brought about solely with the gearwheel. The reason is because the gearwheel can be used to bring the latching pawl into the respectively required pawl position. Owing to the fact that an additional actuator is not required, the seat belt tensioner according to the disclosure can be produced very cost-effectively.

Another advantage of the seat belt tensioner according to the present application can be found in the fact that the blocking device cannot readily be destroyed during the operation by the latching pawl because the latching pawl is pivoted when the force of the gearwheel that acts on the latching pawl exceeds a predetermined maximum force.

A third possible advantage of the present seat belt tensioner may be that the latching pawl can be released without an increase in the seat belt-restraining force acting on the vehicle occupant. All that needs to be done for this is for the gearwheel to be driven in the seat belt-unrolling direction with a driving force, which exceeds the predetermined "pivoting-over force" of the latching pawl.

The latching pawl may be preferably mounted in such a manner that the pivoting-over of the latching pawl from the first pawl position into the second pawl position and/or vice versa can be triggered by the motor force of the drive motor of the seat belt tensioner. To this end, the drive motor is connected to the gearwheel. An advantage of this configuration of the seat belt tensioner may be that the drive motor, which may be present in any case, can be used to shift the latching pawl.

For example, after the latching pawl has been shifted due to an accident from the first pawl position into the second pawl position, the seat belt tensioner can be "reactivated" again by moving the latching pawl back with the drive motor from the second pawl position into the first pawl position again. If the seat belt has been tensioned with the seat belt tensioner without subsequently an accident actually happening and without the latching pawl having been brought into the second pawl position, then the blocking device can advantageously also be unblocked in a corresponding manner by the drive motor by the latching pawl being displaced by the drive motor from the first pawl position into the second pawl position. Thus, the "release peak" occurring in the case of previously known seat belt tensioners does not occur here.

The latching pawl may be preferably held in such a manner that, when there is a predetermined seat belt-extraction force that bears against the shoulder of the vehicle occupant and may be preferably between about 1000 N and about 3000 N (more preferably about 2000 N), the latching pawl is pivoted from the first pawl position into the second pawl position. This ensures that the seat belt can unroll when this seat belt-extraction force is reached, thus avoiding injuries to the vehicle occupant. The unrolling of the seat belt can be predetermined or controlled, for example, by means of a torsion bar or the like. As an alternative or in addition, the unrolling of the seat belt may also be controlled by the drive motor of the seat belt tensioner.

The latching pawl can be held pivotably, for example, in accordance with a toggle-lever principle in order to permit it to be pivoted from the first pawl position into the second pawl position and vice versa.

As an alternative, the pivot pin of the latching pawl may be arranged in an elongated hole of the latching pawl in such a manner that the latching pawl can be pivoted in a direction of rotation about the pivot pin and can be deflected radially to the pivot pin along a guide slot formed by the elongated hole.

At least one latching pawl spring, which pivots the latching pawl toward the gearwheel, may preferably interact with the latching pawl.

It may also be regarded as advantageous if the seat belt tensioner has a mechanical automatic gear, which shifts automatically as a function of load. An advantage of an automatic gear can be seen by the fact that the automatic gear does not require an electric control device, which causes the gear to shift, because the gear is shifted automatically as a function of load. Furthermore, a mechanical automatic gear manages without electric displacement elements, for example, solenoids or pyrotechnic actuating elements.

It can be regarded as advantageous if the seat belt tensioner is completely reversible. A reversible seat belt tensioner makes it possible to use the tensioner, after a first accident event in which the seat belt has been tensioned for a first time by the seat belt tensioner, to tension the seat belt one or more further times. A reversible seat belt tensioner is therefore also capable of use in the situation referred to as a "second impact" (or further accident events).

The automatic gear may preferably have at least two speeds and has a first force transmission path for a first speed with a first transmission ratio and at least one further force transmission path for a second speed and a transmission ratio that is larger than the first transmission ratio.

The automatic gear may preferably have a connecting gearwheel, which is driven by the drive motor of the seat belt tensioner and interacts both with the first force transmission path and with the second force transmission path. The connecting gearwheel can advantageously form the gearwheel with which the latching pawl of the blocking device interacts.

A shifting from the first force transmission path to the second force transmission path can be achieved in a particularly simple, and therefore advantageous, manner if the first force transmission path comprises a sliding clutch, which disengages when a predetermined switching-off moment is exceeded, so that the further force transmission path is activated. The predetermined switching-off moment of the sliding clutch may be preferably dimensioned in such a manner that it corresponds to a seat belt force on the shoulder of the vehicle occupant of between about 200 and about 250 Newtons.

The first force transmission path can be formed in a cost-effective, and therefore advantageous, manner with the sliding clutch, a coupling wheel connected to the sliding clutch, and a spindle clutch toothed ring connected to the seat belt spindle and the coupling wheel.

The sliding clutch may preferably have a pawl carrier, which is mounted rotatably coaxially with the connecting gearwheel. A sliding clutch pawl can preferably be mounted pivotably on the pawl carrier in such a manner that it can be pivoted into a coupling position and into a disengaging position. In its coupling position, the sliding clutch pawl couples the pawl carrier and the connecting gearwheel. In its disengaging position, the sliding clutch pawl is ineffective with regard to the coupling between the connecting gearwheel and the pawl carrier.

The term "seat belt-tensioning direction of rotation" below indicates the direction of rotation in which the seat belt is retracted and is therefore tensioned. With regard to the direction of rotation, it is focused on the action in which the particular rotation has on the seat belt. For example, the drive motor and the seat belt spindle always rotate in opposite directions of rotation because of the automatic gear but nevertheless they each both have the "seat belt-tensioning direction of rotation" during the tensioning of the seat belt. In a corresponding manner, the term "seat belt-unrolling direction" below is understood as meaning the opposite direction of rotation in which the seat belt is unrolled from the seat belt spindle.

The sliding clutch may preferably have a disk cam, which prevents the sliding clutch pawl, after it has reached its disengaging position, from automatically passing again into the coupling position. This has the effect that, after the automatic gear has shifted up from the first speed into the second speed, i.e., from the first force transmission path to the second force transmission path, a shifting back from the second speed to the first speed is prevented as long as such a shifting back is not desired and permitted.

The disk cam and the pawl carrier can be rotated, for example, by a predetermined angle of rotation relative to each other. As soon as the sliding clutch pawl has reached its disengaging position, the disk cam may preferably be rotated by a spring into a blockade position in which it holds the sliding clutch pawl in the disengaging position and prevents the sliding clutch pawl from being reinserted into the connecting gearwheel.

In addition to the sliding clutch pawl already mentioned—called the "first" sliding clutch pawl below—the sliding clutch may preferably have a second sliding clutch pawl. The function of the second sliding clutch pawl is to assist the first sliding clutch pawl in the force transmission. The two sliding clutch pawls can be preferably engaged and disengaged together. The second sliding clutch pawl can be mounted pivotably, for example, on the pawl carrier.

The two sliding clutch pawls may be preferably in each case preloaded in the insertion direction with respect to the connecting wheel. For cost reasons, this preloading of the two sliding clutch pawls is brought about by one and the same pivoting spring.

The seat belt spindle and the automatic gear can be preferably connected to each other with a spindle clutch. The spindle clutch may be preferably configured in such a manner that it engages when the drive motor rotates in the seat belt-tensioning direction of rotation and disengages with a freedom from load when the drive motor rotates in the seat belt-unrolling direction of rotation.

The spindle clutch may preferably have spindle clutch pawls, which are arranged in such a manner that they are inserted into the pawl teeth of the seat belt spindle as soon as the spindle clutch toothed ring rotates in the seat belt-tensioning direction of rotation. As a result the seat belt spindle and the spindle clutch toothed ring couple to each other in a rotationally fixed manner.

In addition, the spindle clutch pawls may be preferably arranged in such a manner that they are pivoted out of the pawl teeth of the seat belt spindle as soon as the spindle clutch toothed ring rotates in the seat belt-unrolling direction and there is a freedom from load. By means of such a pivoting-out of the spindle clutch pawls, the coupling connection between the seat belt spindle and the spindle clutch toothed ring can be separated so that the seat belt spindle can subsequently be rotated freely again. In other words, the spindle clutch pawls therefore only couple in the seat belt-tensioning direction of rotation but not in the seat belt-unrolling direction.

In order to ensure that the spindle clutch pawls are inserted completely into the pawl teeth of the seat belt spindle, the spindle clutch may preferably have a synchronization pawl, which is inserted into the pawl teeth of the seat belt spindle. The seat belt spindle and the spindle clutch toothed ring are thereby aligned with each other before the spindle clutch pawls engage in the pawl teeth of the seat belt spindle. The function of the synchronization pawl is therefore to force a predetermined relative position between the spindle clutch toothed ring and the spindle clutch pawls before the spindle clutch pawls can be inserted into the pawl teeth of the seat belt spindle.

The spindle clutch pawls and the synchronization pawl can preferably be held pivotably in or on a spindle clutch housing, which is aligned coaxially with the seat belt spindle and is mounted rotatably in relation to the seat belt spindle. The spindle clutch housing may be, for example, of a two-part design and may have a spindle clutch carrier and a planet carrier connected thereto.

If the automatic gear has a planetary gear, it can be regarded as advantageous if the spindle clutch housing has at least one fastening point for the rotatable fastening of at least one planet wheel of the planetary gear. For example, the spindle clutch housing can have three fastening points for three planet wheels. The fastening points for the planet wheels may be formed, for example, by pins on which the planet wheels of the planetary gear are rotatably mounted.

A planetary gear may be preferably arranged in the further force transmission path. The planetary gear can preferably revolve in a manner free from force transmission when the sliding clutch is engaged and, only when the sliding clutch is disengaged, is it used for the force transmission. The planetary gear then provides the second speed of the gear.

In order to make it possible for the planetary gear to revolve in a manner free from force transmission, said planetary gear may preferably have a crown wheel, which is driven by at least one planet wheel. An internal sun wheel serves, for example, to drive the at least one planet wheel. An external sun wheel, for example, which is driven by the connecting gearwheel is connected to the internal sun wheel. The internal and external sun wheels may be formed by two separate wheels. As an alternative, the two sun wheels may also be formed by an integral wheel.

The planetary gear may preferably have a planetary clutch pawl that interacts with the crown wheel, that permits a rotation of the crown wheel along a predetermined crown wheel direction of rotation, and that blocks a rotation of the crown wheel counter to the predetermined crown-wheel direction of rotation. The revolving of the planetary gear in a manner free from transmission when the sliding clutch is engaged and with the force transmission when the sliding clutch is disengaged can therefore be ensured with the planetary clutch pawl.

In order to activate the planetary clutch pawl, it is pivoted toward the crown wheel, for example, by a planetary clutch pawl spring.

In order to prevent the gear from being destroyed in the event of a vehicle accident by the high seat belt-restraining forces occurring because of the accident, it may be regarded as advantageous if an overload clutch is arranged between the gear and the seat belt spindle and transmits torques up to a predetermined maximum torque and, when the maximum torque is exceeded, disengages. The overload clutch therefore avoids critical or excessive torques from being transmitted by the seat belt spindle to the gear.

The overload clutch can preferably be formed by two coupling elements, which form a force-locked connection between the gear and the seat belt spindle. The force-locked connection is designed in such a manner that it is automatically cancelled when the predetermined maximum torque is exceeded.

In a particularly simple, and therefore advantageous, manner, the overload clutch can be formed by tapered coupling elements. Specifically, the first coupling element is formed, for example, by an internal taper and the second coupling element is formed by an external taper.

To explain the invention, FIGS. 1 to 15 show various exemplary embodiments for the seat belt tensioner according to the present application. These embodiments of the present invention will now be described with reference to those drawings.

FIG. 1 illustrates a seat belt tensioner 1 for tensioning a seat belt 2. The seat belt tensioner has a drive motor 3, which is connected by its motor pinion 31 to an automatic gear 4. The automatic gear 4 is also connected to a seat belt spindle 5 as a seat belt roller.

As to the automatic gear 4, FIG. 1 shows a connecting gearwheel 10, which is connected to a first force transmission path 6 and a second force transmission path 7 of the automatic gear 4.

In reference to the first force transmission path 6, FIG. 1 shows a spindle clutch toothed ring 61, which is coupled to the connecting gearwheel 10. In regards to the second force transmission path 7, FIG. 1 shows a planetary gear or planet wheel gear 71 with an external sun wheel 711. The external sun wheel 711 is in engagement with the connecting gearwheel 10. An internal sun wheel 712, which interacts with planet wheels that are not visible in FIG. 1, is connected to the external sun wheel 711. The planet wheel gear 71 also has a crown wheel 713, in which its operation will be explained further below.

FIG. 1 also shows a blocking device 8 with a latching pawl 81. The blocking device 8 blocks the connecting gearwheel 10 after seat belt tensioning has taken place so that the drive motor 3 can be switched off. After the seat belt tensioning has taken place, the blocking device 8 can be deactivated again by the drive motor 3 being switched at least temporarily into the seat belt-unrolling direction.

The drive motor 3 and the automatic gear 4 are mounted on an installation plate 9.

Figure 2:
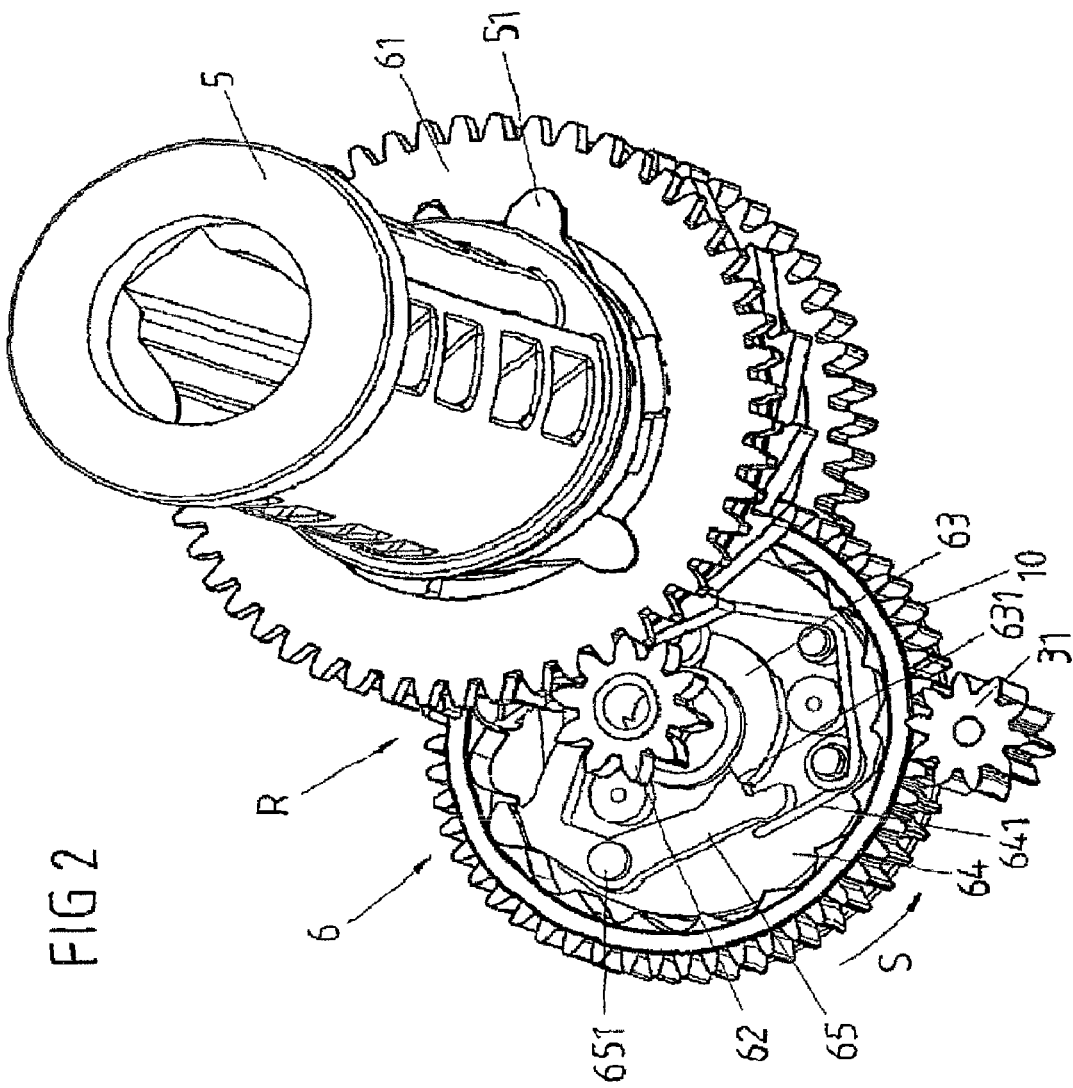
FIG. 2 is a detailed view of a first force transmission path according to an embodiment of the invention.

FIG. 2 illustrates the first force transmission path 6 in detail. It shows the spindle clutch toothed ring 61, which is connected to the seat belt spindle 5 via a spindle clutch 51. The spindle clutch toothed ring 61 is also in engagement with a coupling wheel 62.

The disk cam 63 is fitted rotatably on a pawl carrier 64, which is arranged coaxially with the connecting gearwheel 10. The pawl carrier 64 and the connecting gearwheel 10 are mounted rotatably relative to each other. The coupling wheel 62 is connected in a rotationally fixed manner to the pawl carrier 64, for example by means of a claw clutch.

A first sliding clutch pawl 65 is mounted pivotably about a pivot pin 651 on the pawl carrier 64. The sliding clutch pawl 65 is deflected by means of a pivoting spring 641, which is fastened on the pawl carrier 64 in such a manner that it is in engagement with the internal teeth of the connecting gearwheel 10. In this case, the sliding clutch pawl 65 is aligned in such a manner that a force transmission occurs between the connecting gearwheel 10 and the pawl carrier 64 along the seat belt-tensioning direction of rotation of the seat belt tensioner 1. The seat belt-tensioning direction of rotation is identified in FIG. 2 by the designation S.

It can be seen in FIG. 2 that the disk cam 63 has a cam 631, which interacts with the sliding clutch pawl 65. The function of the cam 631 is to bear against the sliding clutch pawl 65 if the sliding clutch R (formed by the sliding clutch pawl 65, the pawl carrier 64, and the disk cam 63) is engaged.

In the position as illustrated in FIG. 2 of the sliding clutch pawl 65, a direct force transmission takes place between the motor pinion 31, the connecting gearwheel 10, the coupling wheel 62, the spindle clutch toothed ring 61 and the seat belt spindle 5 since the spindle clutch 51 is engaged. The operation of the spindle clutch 51 will be explained further below.

The operation of the sliding clutch R formed by the pawl carrier 64, the disk cam 63, and the coupling wheel 62 is shown in FIG. 3 once again in a detailed illustration. As soon as the torque to be transmitted exceeds a predetermined load moment during a rotational movement along the seat belt-tensioning direction S, the sliding clutch is disengaged by the sliding clutch pawl 65 being pivoted inward counter to the spring force of the pivoting spring 641. When a pivoting movement of this type occurs, the disk cam 63 will rotate along the arrow direction P1 relative to the pawl carrier 64 so that the cam 631 is guided past the sliding clutch pawl 65. In the state illustrated in FIG. 3, the sliding clutch R is therefore disengaged since the sliding clutch pawl 65 has passed into its disengaging position.

Figure 3:
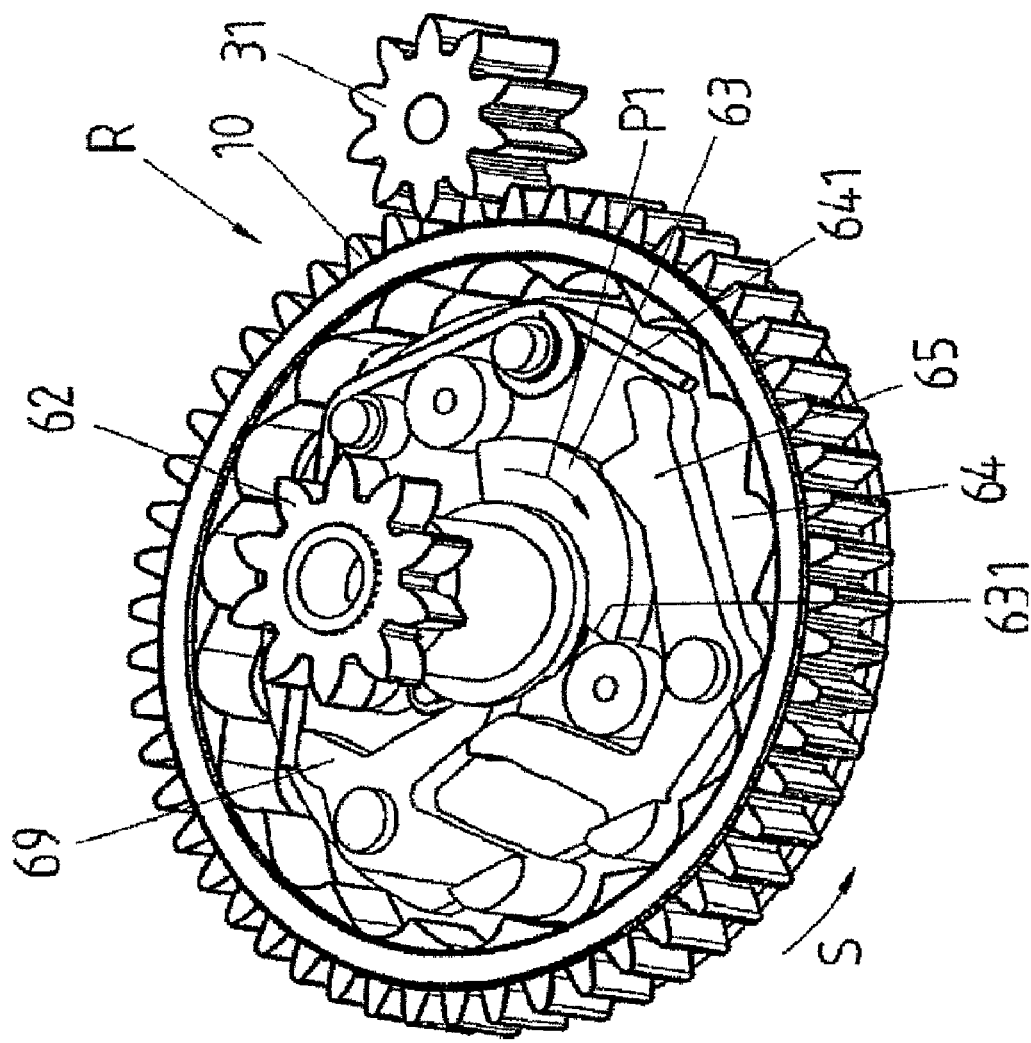
FIG. 3 is a detailed view of the operation of a sliding clutch formed by a pawl carrier, a disk cam, and a coupling wheel.

In addition to the sliding clutch pawl 65, there can moreover be a second sliding clutch pawl 69 as shown in FIG. 3. The function of the second sliding clutch pawl 69 is to assist the first sliding clutch pawl 65 in the force transmission. The second sliding clutch pawl 69 is arranged in such a manner that it is engaged and disengaged together with the first sliding clutch pawl 65.

Figure 4:
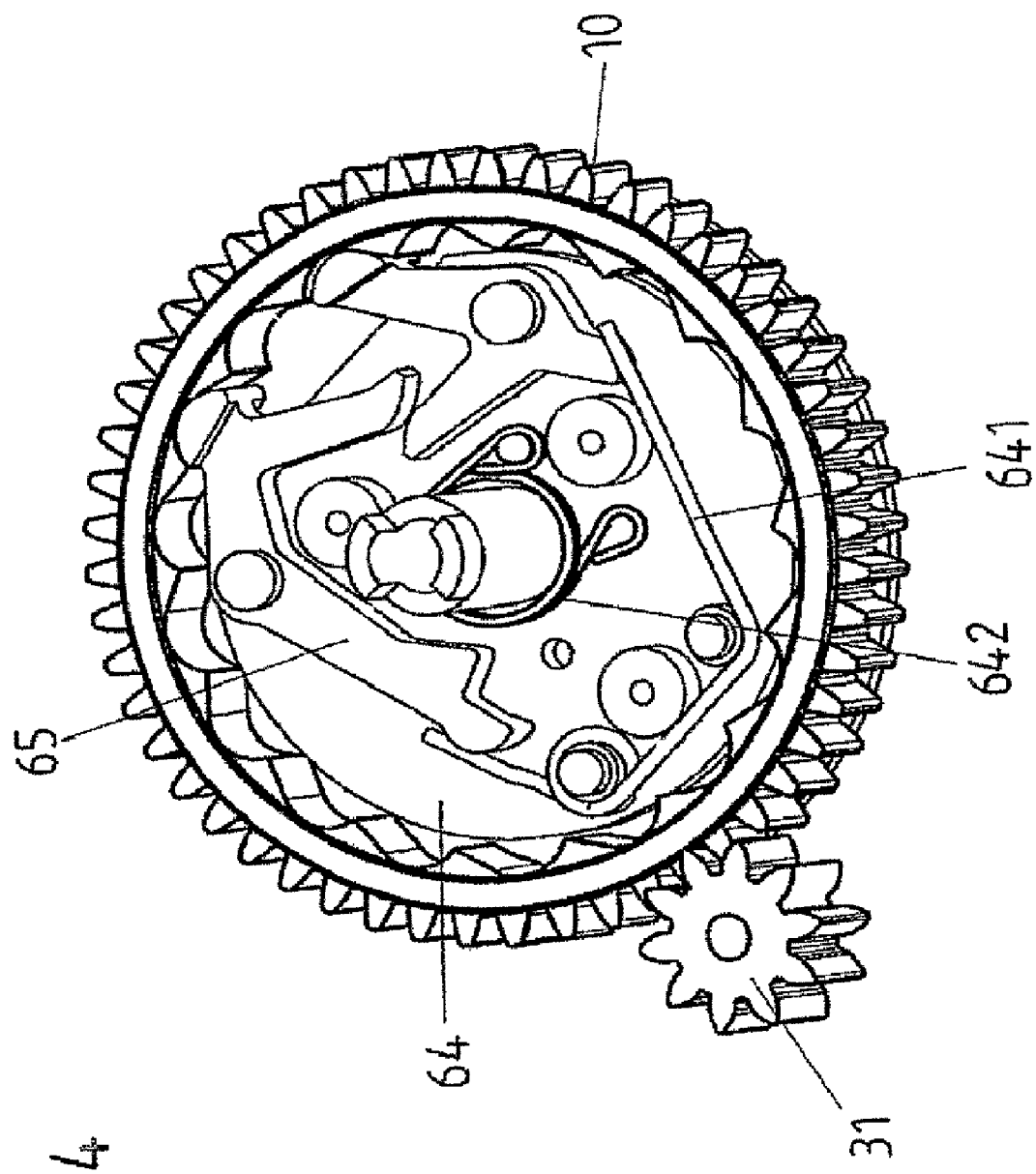
FIG. 4 is a view of the pawl carrier without the coupling wheel or disk cam attached to expose the torsion ring.

FIG. 4 shows a torsion spring 642, which is fastened on the pawl carrier 64 and places the disk cam 63 (not shown in FIG. 4) under a preload on the pawl carrier 64. Due to the torsion spring 642, the disk cam 63 is rotated along the direction of rotation P1 illustrated in FIG. 3 as soon as the sliding clutch pawl 65 has passed into its disengaging position.

The rotation of the disk cam 63 with the cam 631 achieves the effect that the sliding clutch pawl 65, after it has reached its disengaging position illustrated in FIG. 3, can no longer automatically pass again into the coupling position. Thus, the sliding clutch pawl 65 remains disengaged after a disengagement has taken place.

Figure 5:
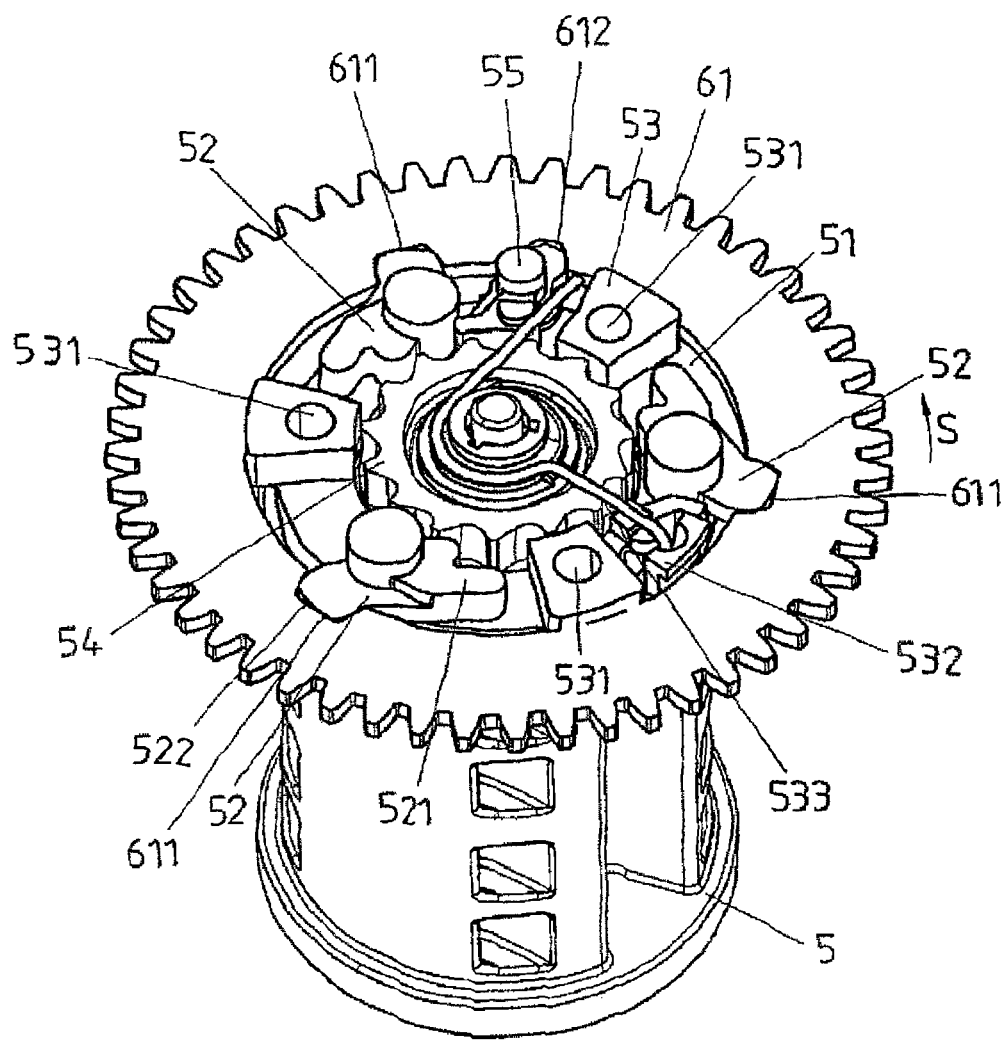
FIG. 5 is a detailed view of a spindle clutch.
Figure 6:
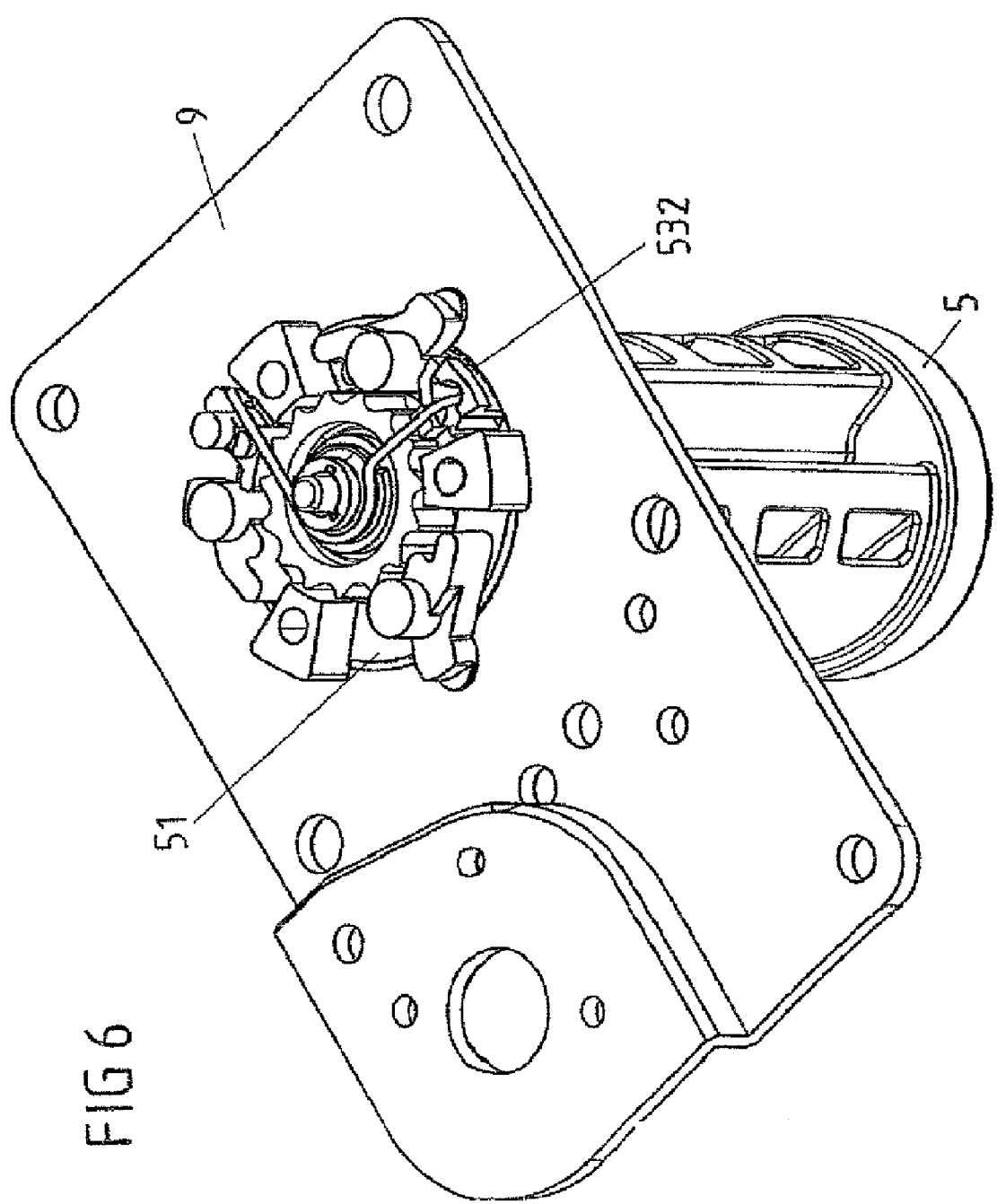
FIG. 6 shows a seat belt spindle together with the spindle clutch after the installation on an installation plate.

In FIG. 5, the spindle clutch 51, already mentioned in conjunction with FIG. 2, of the seat bell spindle 5 is shown in detail. Three spindle clutch pawls 52, which are held pivotably in a spindle clutch housing 53, can be seen. Each of the three spindle clutch pawls 52 has in each case an external cam 522, which is always guided into an associated, inside-edge recess 611 in the spindle clutch toothed ring 61.

In addition, each of the spindle clutch pawls 52 has two inner claws 521, which engage in the pawl teeth 54 of the seat belt spindle 5. The pawl teeth 54 of the seat belt spindle 5 are connected integrally, for example, to the seat belt spindle 5. As can be gathered from FIG. 5, when the spindle clutch toothed ring 61 is driven in the seat belt-tensioning direction of rotation S, the internal claws 521 will engage in the pawl teeth 54 of the seat belt spindle 5 so that a coupling between the seat belt spindle 5 and the spindle clutch toothed ring 61 comes about.

A synchronization pawl 55 can also be seen in FIG. 5. The function of the synchronization pawl 55 is to bring about a coupling between the seat belt spindle 5 and the spindle clutch toothed ring 61 before the spindle clutch pawls 52 pivot in toward the direction of the pawl teeth 54 of the seat belt spindle 5 and engage. The synchronization pawl 55 therefore brings about an adjustment of the spindle clutch pawls 52 with respect to the pawl teeth 54 of the seat belt spindle 5 so that a defined engagement of the spindle clutch pawls 52 in the pawl teeth 54 of the seat belt spindle 5 can take place. A mutual blocking of the spindle clutch pawls 52 is therefore reliably avoided by the synchronization pawl 55. If just a single spindle clutch pawl 52 is used, the synchronization pawl 55 could be omitted.

In FIG. 5, three holes 531 can be seen in the spindle housing 53. Pins, which bear the planet wheels of the planet wheel gear 71 according to FIG. 1, are inserted into the holes 531. The pins and the planet wheels of the planet wheel gear 71 are not illustrated in FIG. 5.

FIG. 5 also shows a brake shoe 532, which is pressed radially outward by means of a brake shoe spring 533 so that it always bears in a bearing hole of the installation plate 9. The function of the brake shoe 532 is to prevent the spindle clutch housing 53 from chattering in relation to the installation plate 9. By means of the brake shoe 532, the manufacturing tolerances in the manufacturing of the spindle clutch housing 53 and of the installation plate 9 are compensated for. The brake shoe spring 533 also has a further function, namely of keeping the synchronization pawl 55 in a disengaged position in relation to the pawl teeth 54. However, when the drive motor 3 is switched on, the force of the brake shoe spring 533 is overcome by the synchronization pawl 55 so that the synchronization pawl can be inserted into the pawl teeth 54.

FIG. 6 once again shows the seat belt spindle 5 together with the spindle clutch 51 after the installation on the installation plate 9.

Figure 7:
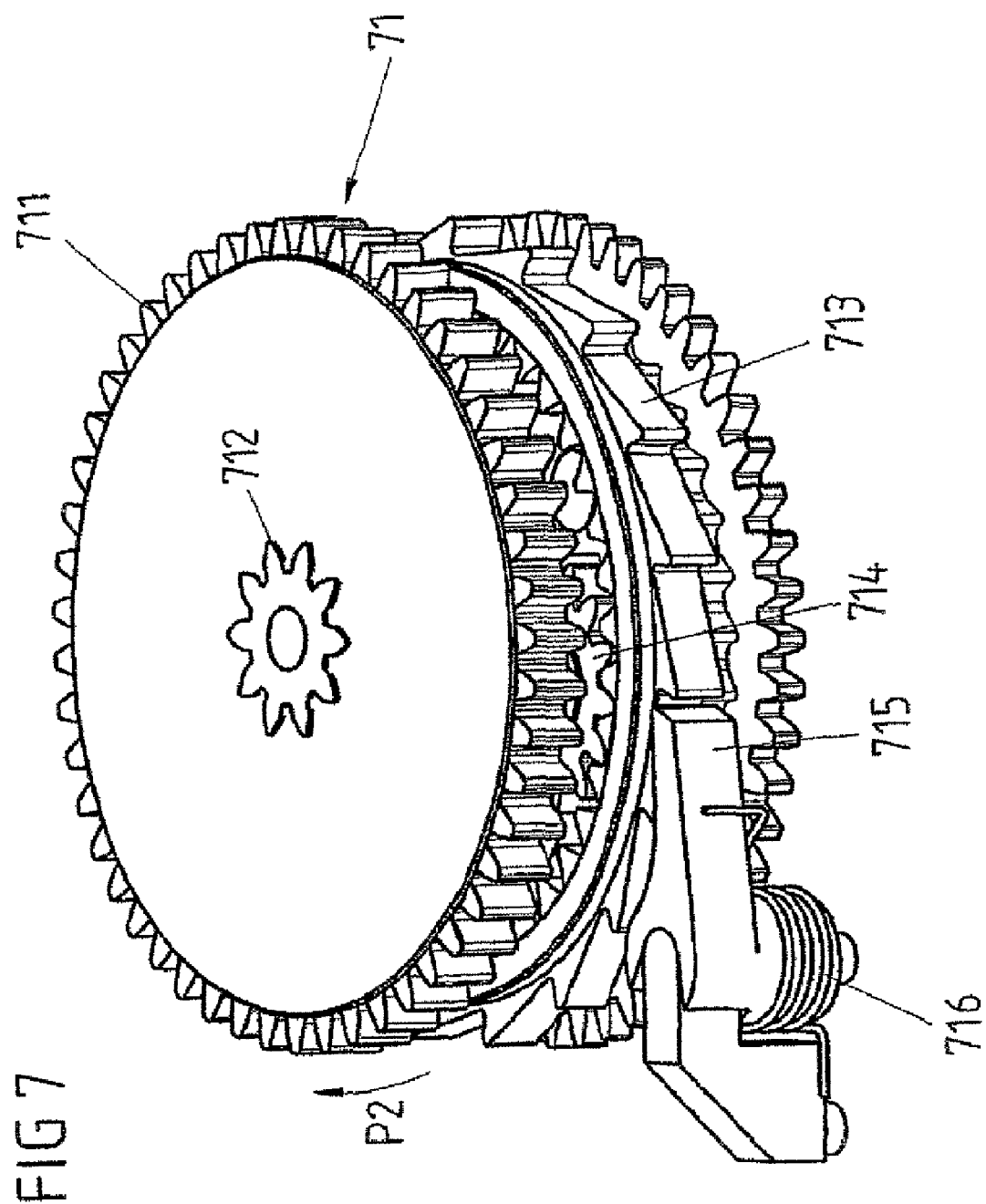
FIG. 7 is a detailed view of a planetary gear according to an embodiment of the present invention.

FIG. 7 shows in detail the planetary gear 71 according to FIG. 1. The external sun wheel 711 and the internal sun wheel 712, which is connected thereto and drives three planet wheels of the planetary gear 71, can be seen. Of the three planet wheels, only one planet wheel 714 can be seen in FIG. 7. The planet wheel 714 and the two other planet wheels are held on pins which are held in the holes 531 of the spindle clutch housing 53 according to FIG. 5.

The crown wheel 713, which interacts with a planetary clutch pawl 715, can also be seen in FIG. 7. The planetary clutch pawl 715 has the effect of enabling the crown wheel 713 to be rotated exclusively counter to the direction of rotation P2. In the process, the planetary clutch pawl 715 ratchets along the external teeth of the crown wheel 713. Along the direction of rotation P2, the planetary clutch pawl 715 blocks a rotation of the crown wheel 713.

The planetary clutch pawl 715 is pressed toward the crown wheel 713 by a planetary clutch pawl spring 716 so that the locking effect (already explained) by the planetary clutch pawl 715 is ensured.

The function of the planetary clutch pawl 715 is to permit the external sun wheel 711, the internal sun wheel 712, and the planet wheel 714 of the planetary gear 71 to revolve without a force transmission to the seat belt spindle 5 occurring. A revolving of the planetary gear 71 in a manner free from force transmission then occurs if the sliding clutch according to FIG. 1 is engaged and the force transmission takes place along the first force transmission path 6.

Figure 8:
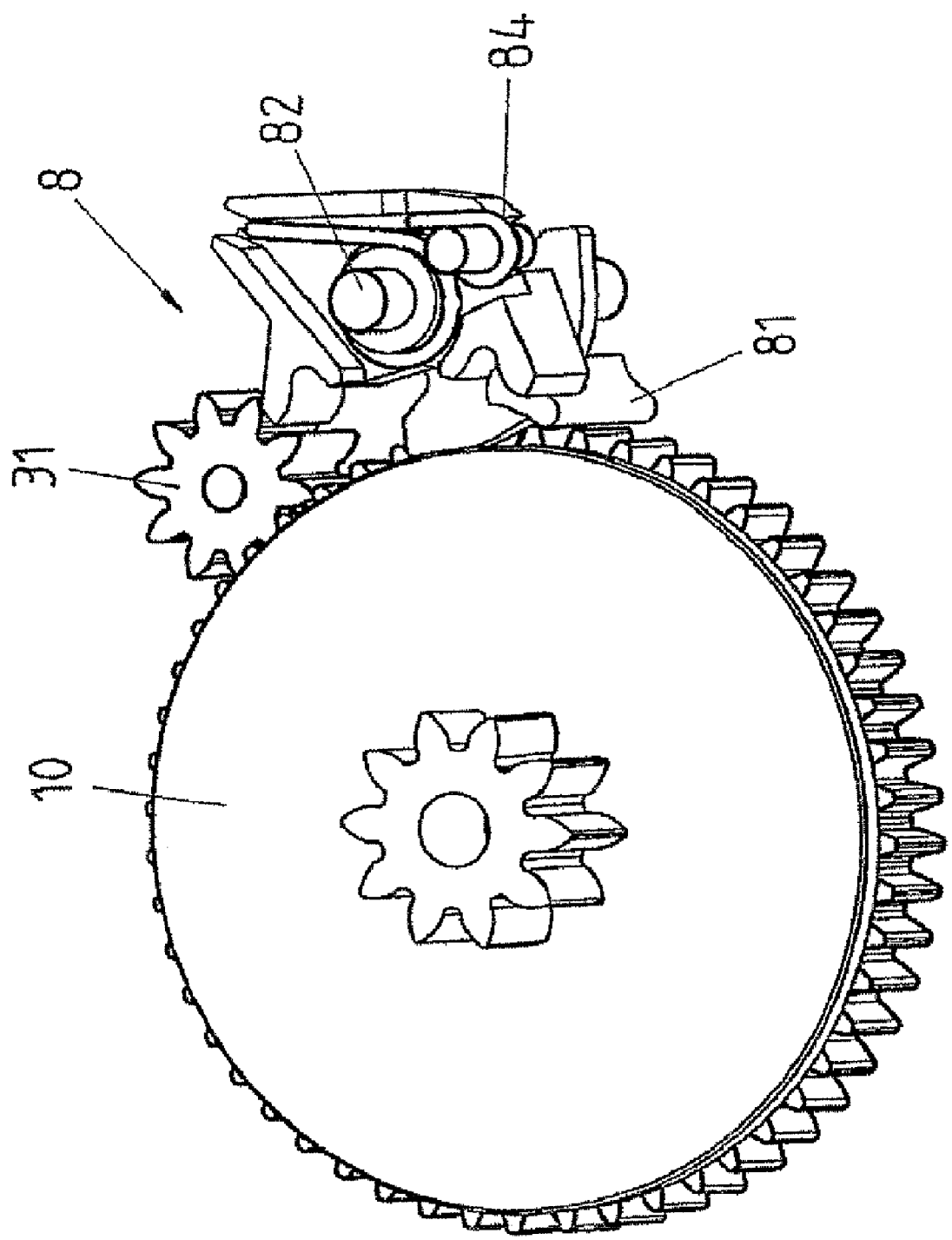
FIG. 8 shows the construction and the operation of a blocking device according to an embodiment of the present invention.

In conjunction with FIGS. 8 to 10, the construction and the operation of the blocking device 8 according to FIG. 1 will now be explained. FIG. 8 shows the latching pawl 81, which is held rotatably on a bearing pin 82. The latching pawl 81 is guided on the bearing pin 82 via an elongated hole 83 (as seen in FIG. 9).

A latching pawl spring 84 is connected to the latching pawl 81. The function of the latching pawl spring 84 is to press the latching pawl 81 toward the connecting gearwheel 10.

The object of the latching pawl 81 is to keep the seat belt 2 in the tensioned position after the seat belt has been tensioned by the drive motor 3. The latching pawl 81 brings this about by the fact that it prevents the connecting gearwheel 10 from rotating back in the seat belt-unrolling direction. The latching pawl 81 therefore blocks the connecting gearwheel 10 in the seat belt-unrolling direction A as shown in FIG. 9.

Figure 9:
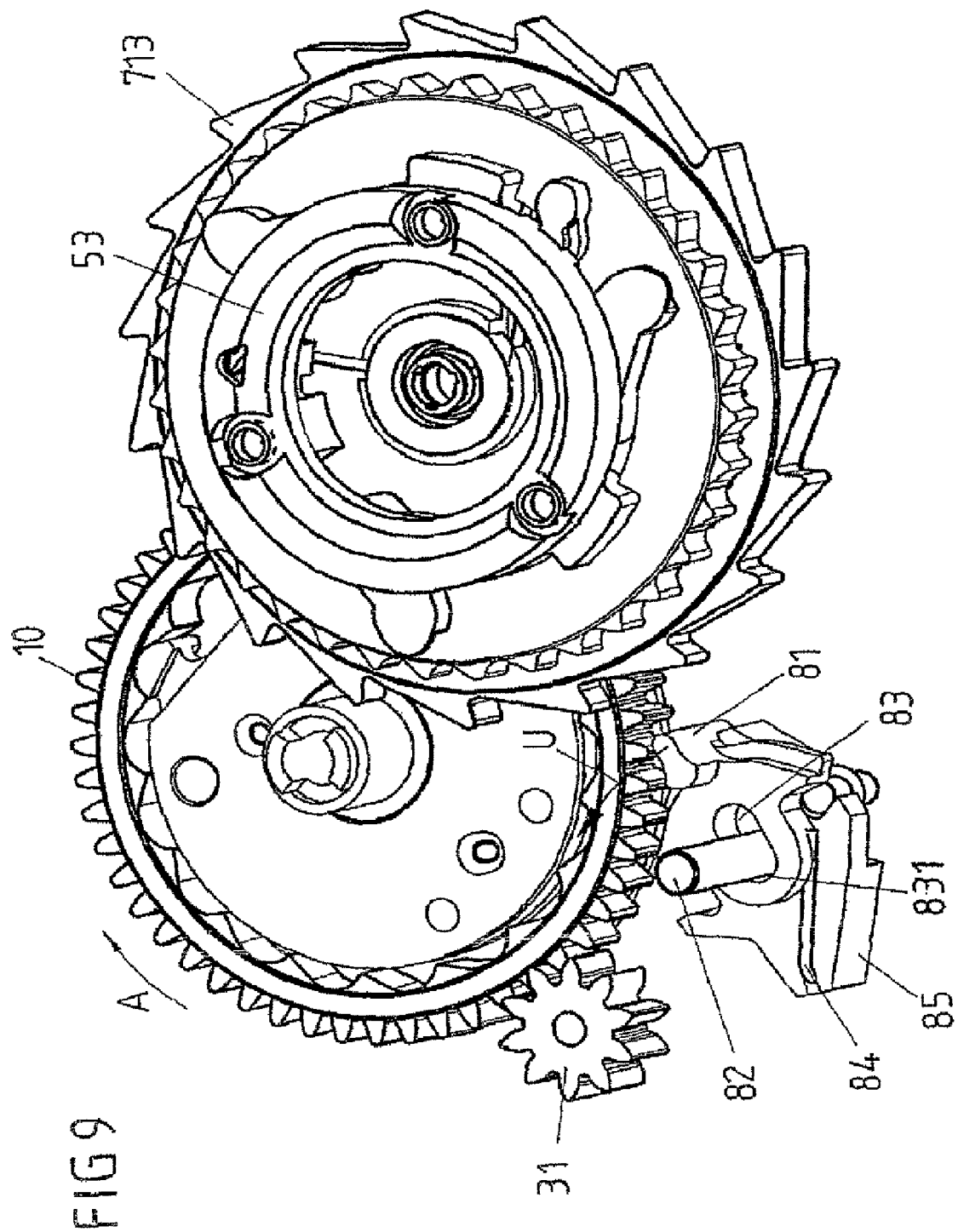
FIG. 9 shows the lower view of the operation of the blocking device with a latching pawl in a first pawl position.

It can also be seen in FIG. 9 that it is possible, owing to the multiplicity of latching teeth on the outside of the connecting gearwheel 10 to keep the seat belt 2 in virtually any position using the latching pawl 81. An undesirable yielding of the seat belt 2 due to the play in the blocking device 8 is therefore limited. In the case of the exemplary embodiment, the undesirable yielding of the seat belt 2 is smaller than 1.5 degrees with regard to the angle of rotation of the seat belt spindle 5.

In the event of an accident, the seat belt-extraction force acting on the seat belt 2 will increase severely as soon as the vehicle occupant held by the seat belt 2 presses against the seat belt. In order then to permit the seat belt 2 to yield so that injuries due to the seat belt are avoided, the latching pawl 81 is pivoted (the pivoting direction U) from the first pawl position illustrated in FIG. 9 (the latching pawl 81 faces away from the motor pinion 31) into a second pawl position illustrated in FIG. 10 (the latching pawl 81 faces the motor pinion 31) when a predetermined maximum seat belt-extraction force is exceeded. The predetermined seat belt-extraction force may be preferably between about 1000 and about 3000 Newtons, more preferably about 2000 Newtons with regard to the seat belt force on the shoulder of the vehicle occupant.

The unrolling speed of the seat belt can be controlled, for example, with the drive motor 3 since its motor pinion 31 is always in engagement with the connecting gearwheel 10. Thus, with the drive motor 3 being energized in the seat belt-tensioning direction of rotation, the unrolling of the seat belt can be stopped.

A pivoting of the latching pawl 81 is possible because the latching pawl 81 is held in an elastically resilient manner in the elongated hole 83 by the latching pawl spring 84. When the predetermined seat belt-extraction force is exceeded, the latching pawl 81 is therefore pressed away from the connecting gearwheel 10 counter to the restoring force of the latching pawl spring 84. This permits the latching pawl 81 to pivot or flip over in such a manner that it is transferred into the second pawl position illustrated in FIG. 10 (the pivoting direction U in FIGS. 9 and 10). The latching pawl 81 pivots together with a latching block 85. This takes place as follows: when the predetermined seat belt-extraction force is reached, the latching pawl 81 is pressed in the direction of the latching block 85. In the process, a cam 86 of the latching pawl 81 strikes against a stop 87 of the latching block 85. As a result, the latching block 85 then pivots counterclockwise (cf. FIG. 8) about the bearing pin 82 so that the latching pawl 81 is released for pivoting-over according to the pivoting direction U and then the pivoting-over takes place.

Figure 10:
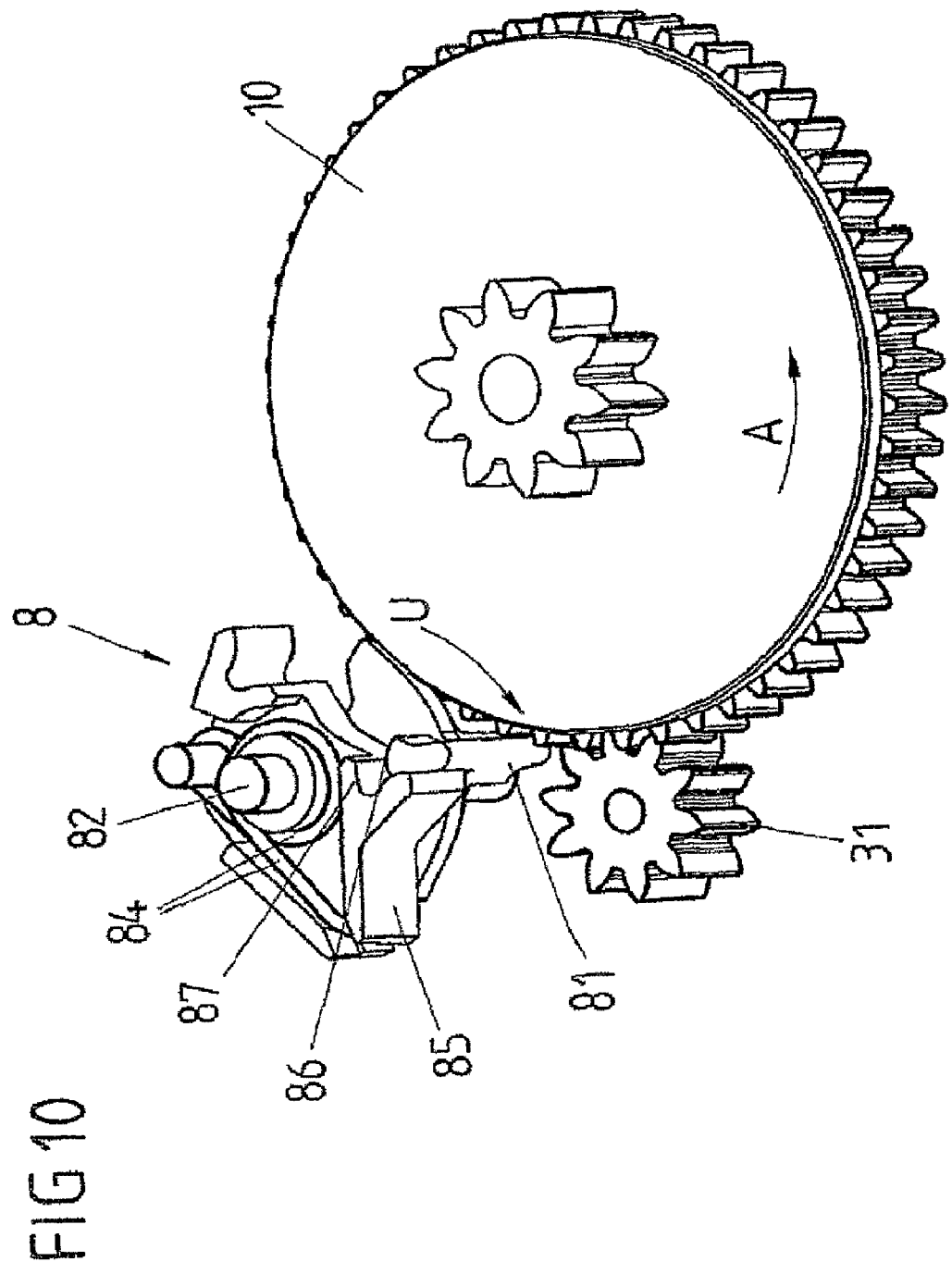
FIG. 10 shows the upper view of the operation of the blocking device with the latching pawl in a second pawl position.

In the second pawl position illustrated in FIG. 10 (the latching pawl 81 faces the motor pinion 31), the latching pawl 81 no longer prevents an unrolling of the seat belt 2. Thus, the seat belt 2 can unroll when the motor drive 3 is switched off. In the second pawl position, the latching pawl only slides along the run on the collar of the connecting gearwheel 10. This makes it possible to unroll the seat belt 2 in a specific manner by means of further devices, for example, a torsion bar, such that there is a reduced seat belt-restraining force on the vehicle occupant.

In conjunction with FIGS. 9 and 10, it should be mentioned that FIG. 9 shows the connecting gearwheel 10 from its lower side and FIG. 10 shows it from its upper side. In addition, the crown wheel 713 and the spindle clutch housing 53 can be seen from the lower side in FIG. 9.

Since the components of the seat belt tensioner 1 have been explained in detail in conjunction with FIGS. 1 to 10, the interaction of the components in the event of a vehicle accident will now be explained once again for better comprehension.

In the event of a vehicle accident or a situation shortly before an accident, the seat belt tensioner 1 (cf. FIG. 1) is activated. In the case of an activation of this type, the drive motor 3 is put into operation in such a manner that it retracts and tensions the seat belt 2. The drive motor 3 is therefore operated in the seat belt-tensioning direction of rotation.

Figure 12:
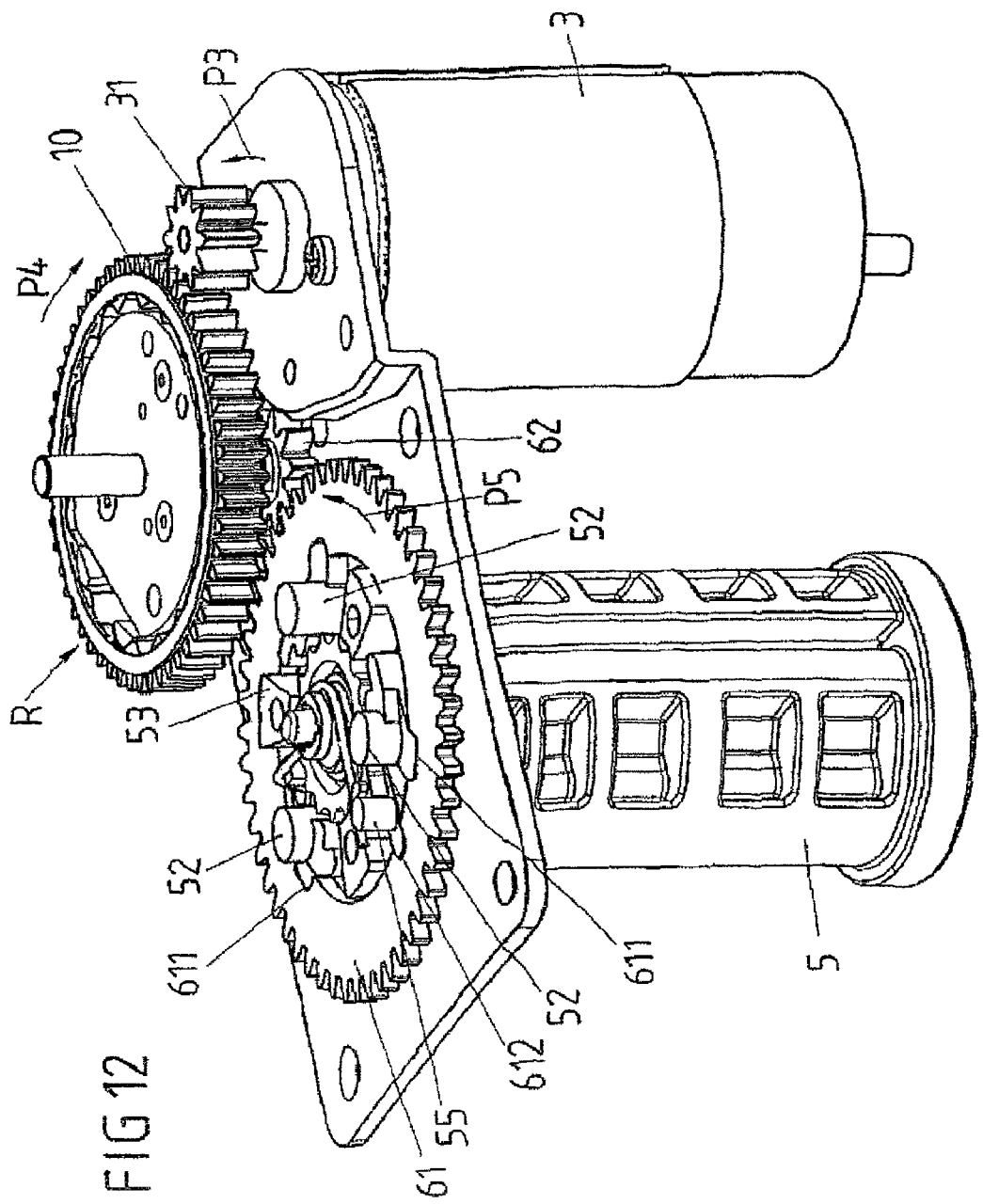
FIG. 12 shows the operation of the seat belt tensioner when the drive motor is operated in the seat belt-tensioning direction of rotation.

The motor pinion 31 therefore rotates according to the direction of rotation P3 according to FIG. 12. Owing to this rotation of the motor pinion 31, the connecting gearwheel 10 is rotated along the direction of rotation P4. The coupling wheel 62 therefore drives the spindle clutch toothed ring 61 in the direction of rotation P5. Owing to the rotation of the spindle clutch toothed ring 61, the synchronization pawl 55 will be inserted into the pawl teeth 54 of the seat belt spindle 5 and will bring about a defined position between the spindle clutch toothed ring 61 and the pawl teeth 54 of the seat belt spindle 5. Subsequently, the three spindle clutch pawls 52 will then be inserted into the pawl teeth 54 of the seat belt spindle 5 so that the spindle clutch 51 is transferred from the initially disengaged position into the engaged position.

The function of the three spindle clutch pawls 52 is therefore to bring about a rotational connection between the drive motor 3 and the seat belt spindle 5 during rotation of the motor pinion 31. Before the drive motor 3 is activated, the spindle clutch 51 is still in the uncoupled state so that the seat belt spindle 5 can rotate entirely freely of the automatic gear 4. The automatic gear 4 and the drive motor 3 are therefore separated from each other before an accident or a hazardous situation occurs with the result that the seat belt 2 can be unrolled from the seat belt spindle 5 without great force and therefore very comfortably. Only in the event of an accident or a hazardous situation is the spindle clutch 51 activated with the drive motor 3 being switched on.

After the drive motor 3 is switched on, the force transmission to the seat belt spindle 5 first takes place via the motor pinion 31, the connecting gearwheel 10, the spindle clutch toothed ring 61, and the spindle clutch 51. That is, the first force transmission path 6 according to FIG. 1 is activated. The transmission ratio of the first force transmission path or of the "first speed" of the automatic gear 4 is, for example, 26:1. This means that the seat belt spindle 5 rotates through a single revolution during 26 revolutions of the drive motor 3.

As soon as the drive motor 3 is activated and the spindle clutch toothed ring 61 is rotated according to the direction of rotation P5 according to FIG. 12, the seat belt 2 is retracted on the seat belt spindle 5 so that a tensioning of the seat belt occurs. With increasing tensioning of the seat belt, the force acting on the automatic gear 4 and therefore the sliding clutch R becomes ever greater. As soon as the tensioning force in the shoulder region of the vehicle occupant has reached a force of, for example, about 200 to about 250 Newtons, the sliding clutch R explained in conjunction with FIG. 2 will disengage. The sliding clutch R can be seen from the lower side in FIG. 2.

If the "first" speed is active, the planetary gear 71 according to FIG. 1 is rotated by the connecting gearwheel 10 and initially revolves in a manner free from force transmission. In this case, the revolving of the planet wheel gear 71 in a manner free from force transmission is possible since the crown wheel 713 of the planetary gear 71 can rotate freely at the same time counter to the arrow direction P2 according to FIG. 7.

If the sliding clutch R according to FIG. 2 is now disengaged, the spindle clutch toothed ring 61 is no longer driven by the coupling wheel 62. This results in the crown wheel 713 now being rotated along the direction of rotation P2 according to FIG. 7 but this is prevented by the planetary clutch pawl 715. Owing to the blocking of the crown wheel 713, a force transmission by the planetary gear 71 now occurs so that the seat belt spindle 5 is now driven by the second force transmission path 7. In the second force transmission path 7, i.e., in the "second speed" of the automatic gear 4, the transmission ratio is, for example, 127:1. The planetary gear 71 therefore multiplies the transmission ratio with respect to the first speed of the automatic gear 4 by the factor 4.8.

Owing to the shifting of the automatic gear 4 into the second speed, the tensioning force of the seat belt tensioner 1 is raised with the result that the seat belt 2 is tensioned with a great tensioning force. As soon as a predetermined tensioning force is reached and the tensioning operation is finished, the drive motor 3 is switched off in order to prevent a further load on the electric system of the vehicle battery by the drive motor 3. In order then to avoid the seat belt 2 from being able to unroll again from the seat belt spindle 5, the connecting gearwheel 10 has to be blocked in the tensioning position. This takes place by means of the blocking device 8 and the latching pawl 81, which is initially in the first pawl position illustrated in FIGS. 8 and 9. In the first pawl position, the connecting gearwheel 10 can rotate in the seat belt-tensioning direction whereas an unrolling of the seat belt 2 from the seat belt spindle 5 is prevented. The latching pawl 81 therefore results in the tensioning force of the seat belt 2 being kept.

If, in the event of an accident, the vehicle occupant is pressed against the seat belt 2, the restraining force exerted by the seat belt 2 will rise severely. In order to bring about a yielding of the seat belt 2 and a restricting of the restraining force, the blocking device 8 according to FIG. 1 has to be switched off if a predetermined maximum seat belt-extraction force is exceeded. This takes place in the case of the seat belt tensioner 1 by the latching pawl 81 being pivoted from the first pawl position illustrated in FIG. 9 into the second pawl position illustrated in FIG. 10. The pivoting of the latching pawl 81 is possible owing to the elongated hole 83. Owing to the latching pawl 81 being flipped or pivoted over into the second pawl position, an unrolling of the seat belt 2 from the seat belt spindle 5 is subsequently possible. The further unrolling of the seat belt 2 from the seat belt spindle 5 is ensured by further safety devices, for example, a torsion bar which is arranged in the interior of the seat belt spindle 5.

The seat belt tensioner 1 according to FIG. 1 is of a completely reversible design, which means that it can be reset into its starting state after a first commissioning. This will be explained in detail below with two different accident scenarios being differentiated: (a) a predetermined seat belt-extraction force has been exceeded and (b) a predetermined seat belt-extraction force has not been exceeded.

In the case of the accident scenario where a predetermined seat belt-extraction force has been exceeded, after the seat belt has been tensioned, the predetermined seat belt-extraction force is exceeded so that the latching pawl 81 is transferred into its second pawl position, as has been explained above in conjunction with FIGS. 8 and 9. The resultant starting positions of the latching pawl 81, the disk cam 63, and the sliding clutch pawl 65 are once again shown in FIG. 13.

Figure 13:
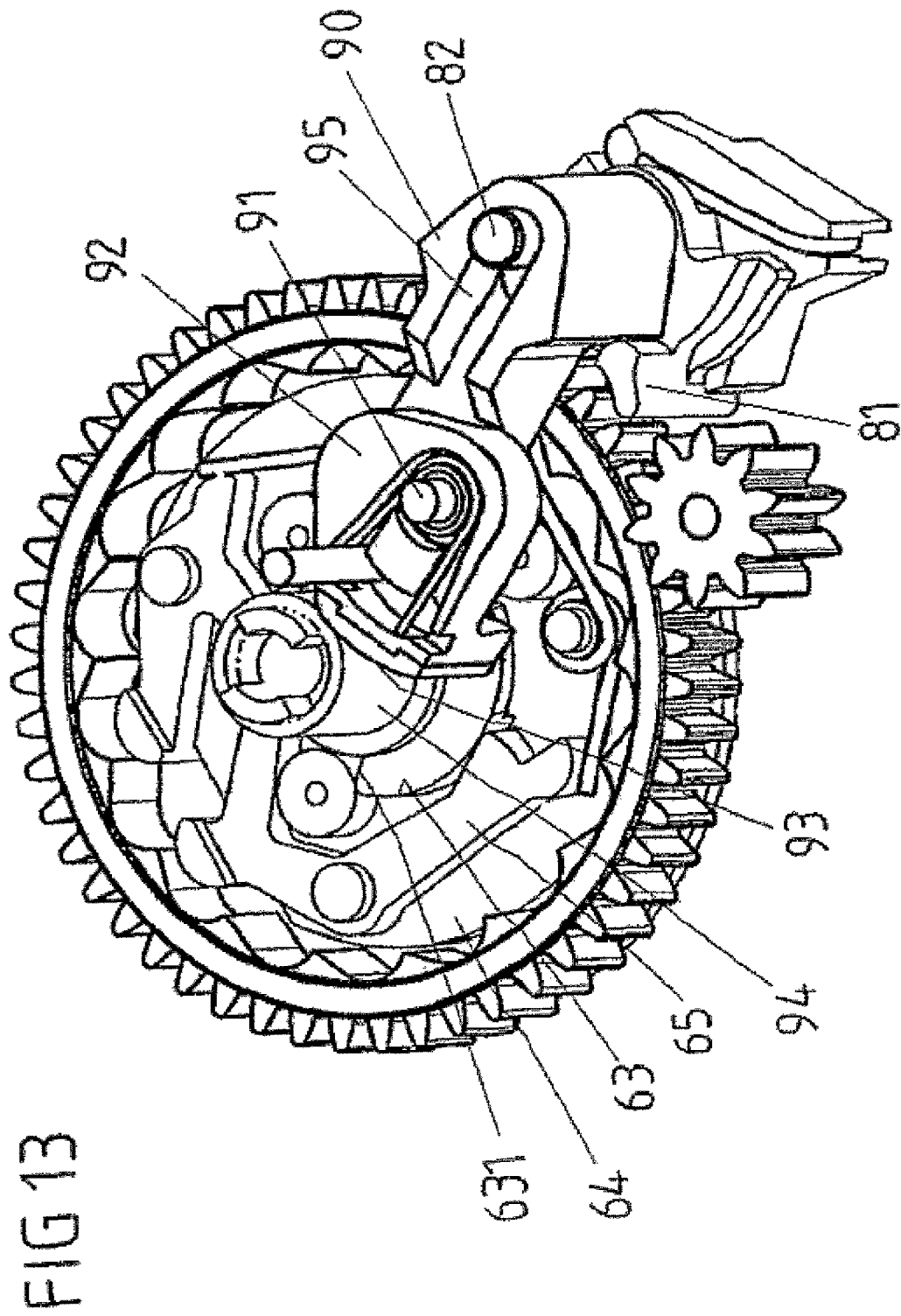
FIG. 13 shows the resultant positions of the latching pawl, the disk cam, and the sliding clutch pawl after an accident where the predetermined seat belt-extraction force has been exceeded.

FIG. 13 also shows a connecting rod 90, which is connected rotatably to a friction element 92 via a friction element bearing pin 91. A friction surface 93 (e.g. rubber), which bears against a stem 94 of the disk cam 63, is arranged on the outside of the friction element 92. The connecting rod 90 is guided on the bearing pin 82 via an elongated hole 95. The position of the friction surface 93 relative to the stem 94 arises due to the above-explained flipping of the latching pawl 81 over from the first pawl position into the second pawl position.

Figure 14:
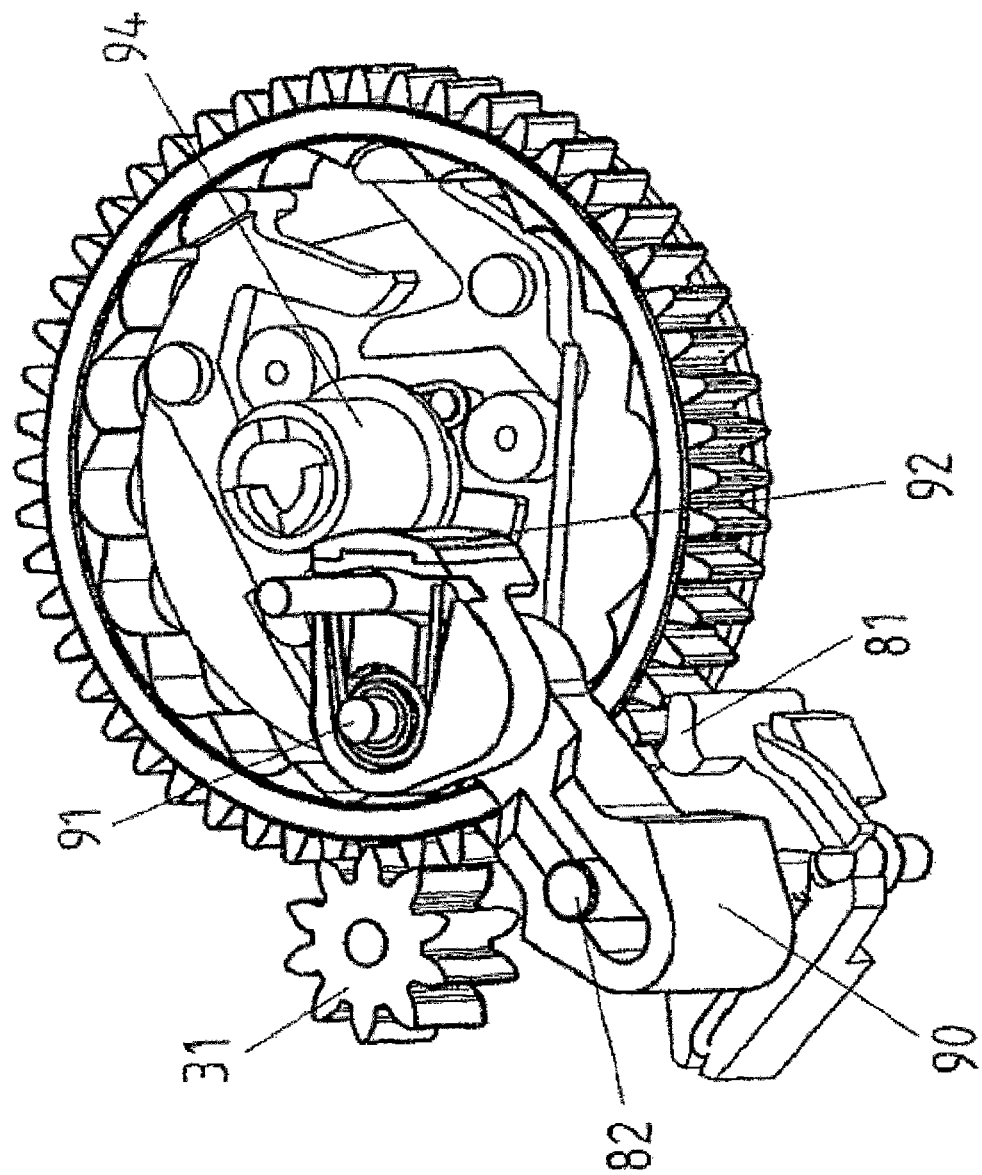
FIG. 14 shows the latching pawl that is pivoted back into its first pawl position after an accident where the predetermined seat belt-extraction force has been exceeded.

Since, in the case of a rotation of the motor pinion 31 (due to the planetary gear), the coupling wheel 62, the pawl carrier 64, and the disk cam 63 with the stem 94 will also passively rotate at the same time, the friction surface 93 and therefore the friction element 92 are pivoted away and the connecting rod 90 is displaced in the elongated hole 95 (cf. FIG. 13). If the drive motor is now operated once again in the tensioning direction, then the latching pawl 81 is pivoted back into its first pawl position (FIG. 14). As a result, the stem 94 and therefore the disk cam 63 are rotated in relation to the pawl carrier 64 counter to the spring force of the torsion spring 642 so that the cam 631 is rotated back into the position illustrated in FIG. 2. The sliding clutch pawl 65 is therefore released again for engagement with the connecting gearwheel 10.

During a further operation of the drive motor 3 in the seat belt-tensioning direction, the sliding clutch pawl 65 will then be inserted into the connecting gearwheel 10 so that the "first" speed of the automatic gear 4 is activated. Since the latching pawl 81 has been "flipped over" or shifted by the drive motor 3 from its second pawl position back into its first pawl position, a blocking of the seat belt 2 after tensioning of the seat belt has taken place is possible.

Figure 15:
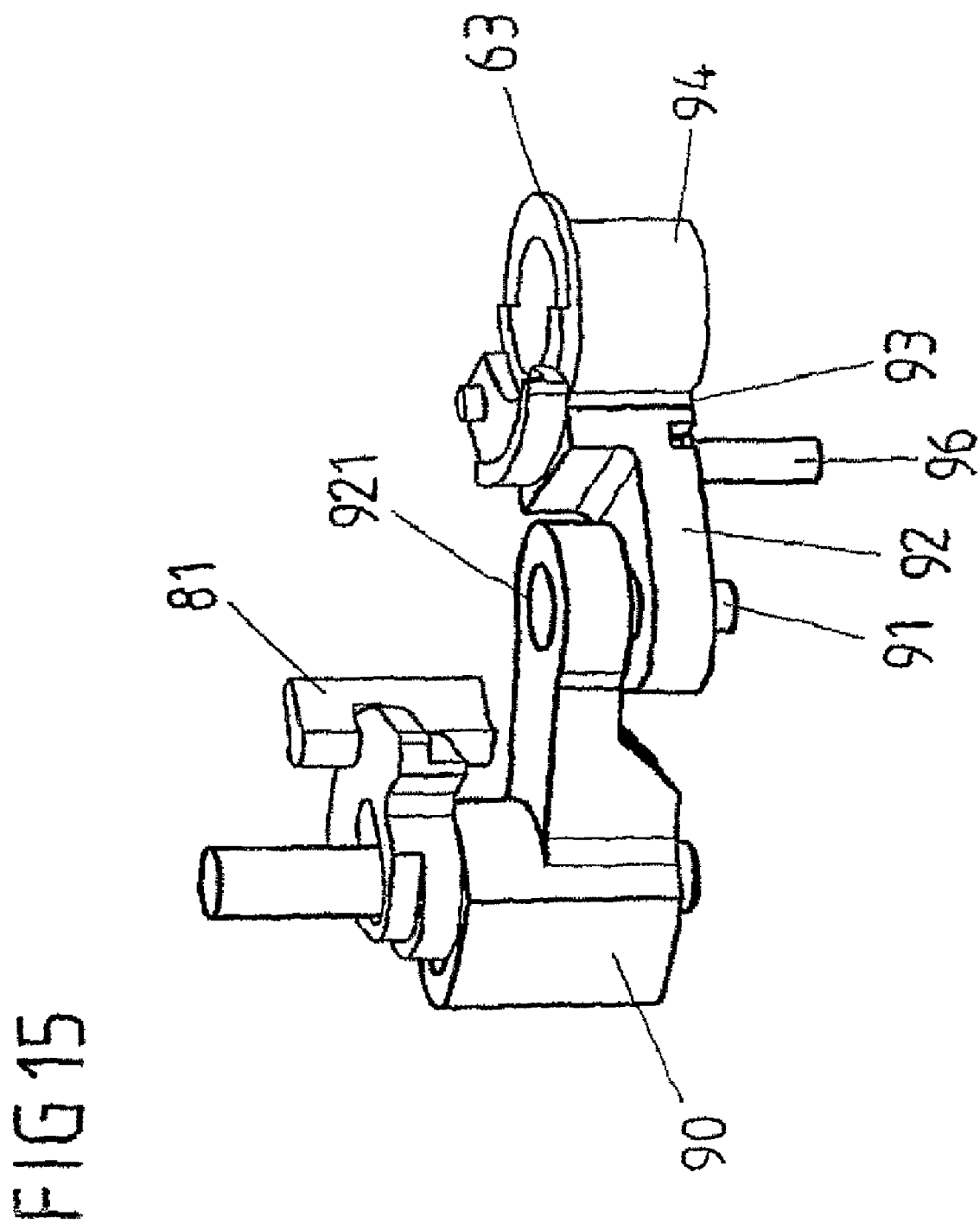
FIG. 15 shows a detailed view of an assembly comprising a connecting rod, a connecting rod pin, a friction element, and the latching pawl according to an embodiment of the present invention.

For better comprehension of the operation, FIG. 15 shows the connecting rod 90, a connecting rod pin 921, the friction element 92, and the latching pawl 81 in detail. A stop pin 96, which is fitted fixedly on the installation plate 9, is also seen. The stop pin 96 is guided in a slotted guide of the friction element 92 and, at the end positions of the friction element 92, strikes against, for example, spring-mounted stops of the friction element 92.

If the predetermined seat belt-extraction force is not exceeded, the latching pawl 81 is consequently not flipped over into the second pawl position. The latching pawl 81 has therefore remained in its first latching position so that the position of the latching pawl 81 and the position of the connecting rod 90 and of the friction element 92 correspond to the position shown in FIG. 14.

In order now to move the latching pawl 81 into the non-blocking, second pawl position and to relax the seat belt, the driving motor 3 is first operated in the seat belt-unrolling direction so that the latching pawl 81, the connecting rod 90, and the friction element 92 are transferred into the positions according to FIG. 13. The seat belt tensioner can therefore be activated again.

For renewed tensioning of the seat belt, the drive motor 3 is operated in the seat belt-tensioning direction of rotation with the result that the sequence of movements according to the situation where the predetermined seat belt-extraction force has been exceeded is run through. As a result, the automatic gear 4 is again shifted into the "first speed" so that the first force transmission path 6 is active. The seat belt tensioner is therefore ready for use for further tensionings of the seat belt.

During an operation of the drive motor 3 in the seat belt-unrolling direction, the spindle clutch toothed ring 61 is furthermore likewise rotated owing to the corresponding rotation of the connecting gearwheel 10 so that the spindle clutch pawls 52 (explained in detail in conjunction with FIG. 5) can be rotated out of the pawl teeth 54 of the seat belt spindle 5 when there is a freedom from load. The same applies to the synchronization pawl 55, which is likewise rotated out of the pawl teeth 54 of the seat belt spindle 5. Because of the rotating out of the three spindle clutch pawls 52 and the synchronization pawl 55, the spindle clutch 51 is disengaged so that the seat belt spindle 5 can freely rotate. Thus, the seat belt spindle 5 is separated from the planetary gear 71, from the second force transmission path 7, and from the first force transmission path 6. The synchronization pawl 55 and subsequently the spindle clutch pawls 52 are re-engaged only when the drive motor rotates again in the seat belt-tensioning direction of rotation, and the spindle clutch toothed ring 61 is driven in the direction illustrated in FIG. 5 by the designation S.

If, after the seat belt has been tensioned and the blocking device 8 has been activated, an accident does not occur, contrary to expectations, because the hazardous situation could be averted, then the seat belt 2 has to be able to be loosened again. This takes place in the ease of the seat belt tensioner 1 (as has already been explained above in conjunction with the reengagement of the sliding clutch R) by the drive motor being briefly operated in the seat belt-unrolling direction. The connecting gearwheel 10 causes the latching pawl 81 to be "flipped over" or shifted from its first (blocking) pawl position into its second pawl position so that the seat belt can unroll. The unrolling speed of the seat belt can be controlled, for example, with the drive motor 3 since its motor pinion 31 is always in engagement with the connecting gearwheel 10. Thus, by energizing the drive motor 3 in the seat belt-tensioning direction of rotation, the unrolling of the seat belt can be stopped.

As already mentioned, in the case of an operation of the drive motor 3 in the seat belt-unrolling direction, when there is a freedom from load, the spindle clutch 51 is deactivated so that the seat belt is separated from the automatic gear 4. Within the context of the latching pawl 81 flipping over from the first pawl position into the second pawl position, the seat belt force is not increased so that the occurrence of the otherwise customary "release peak" is avoided. That is, the switching off of the tensioning of the seat belt is associated with no further increase in the seat belt restraining force for the vehicle occupant.

Figure 11:
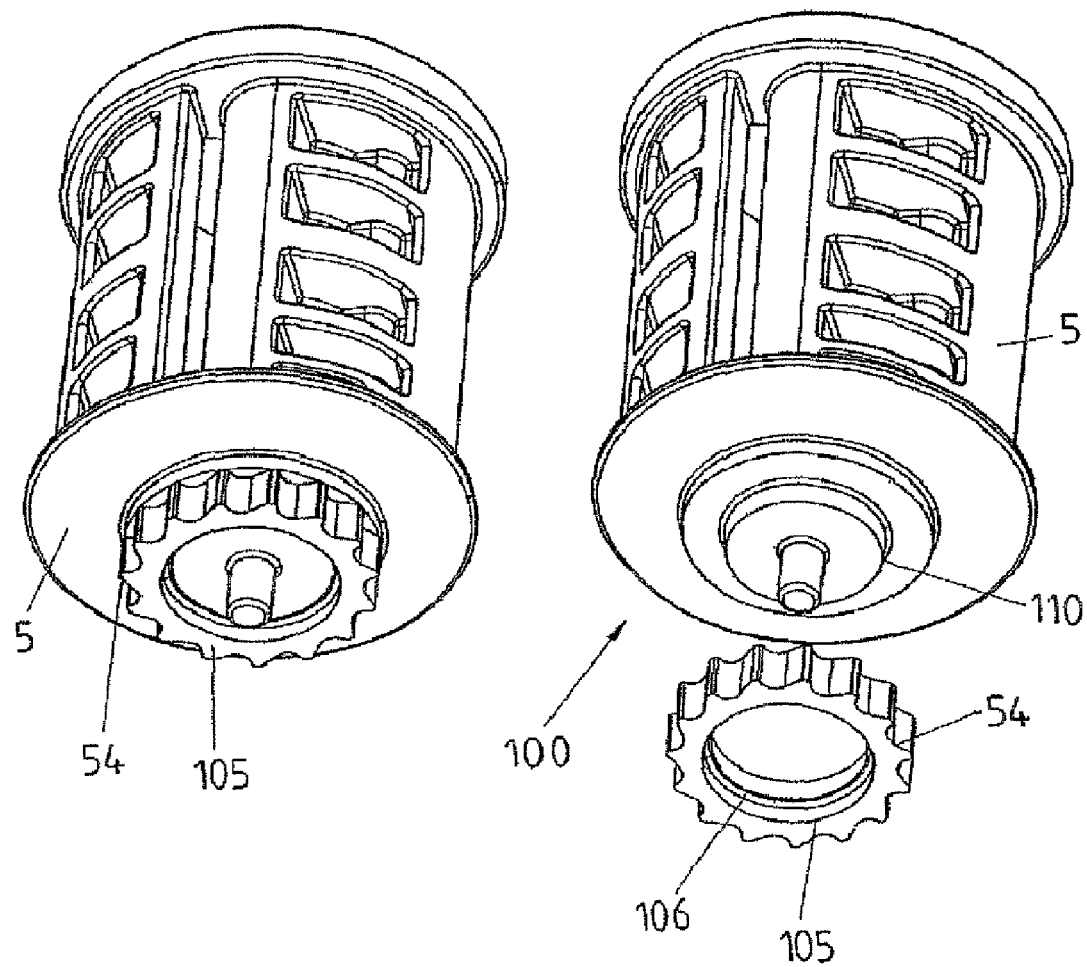
FIG. 11 shows an overload clutch that can be arranged between the pawl teeth of the seat belt spindle and the seat belt spindle.

Moreover, an overload clutch can be arranged between the pawl teeth 54 of the seat belt spindle 5 and the seat belt spindle 5. FIG. 11 shows an exemplary embodiment of such an overload clutch. The overload clutch 100 according to FIG. 11 connects the seat belt spindle 5 and the automatic gear 4 to each other. The overload clutch 100 has an overload clutch ring 105. The external teeth of the overload clutch ring form the pawl teeth 54 of the seat belt spindle 5 and the inner surface of the overload clutch ring forms an internal taper 106. In addition, the overload clutch 100 forms an external taper 110 that is connected, for example integrally, to the seat belt spindle 5.

The function of the internal taper 106 and of the external taper 110 is to protect the automatic gear 4 according to FIG. 1. As soon as the seat belt spindle 5 applies a torque, which exceeds a predetermined maximum torque to the overload clutch 100, the overload clutch 100 will interrupt the rotational connection between the seat belt spindle 5 and the automatic gear 4 by means of a slip.

The interruption in the coupling connection is based on the severing of the force-locked connection between the external taper 110 and the internal taper 106. This is because, when the predetermined maximum torque is exceeded, the external taper 110 will "slide" in the internal taper 106.

The maximum torque may be preferably dimensioned in such a manner that the latching pawl 81 does not flip over from the first pawl position into the second pawl position. The latching pawl therefore remains in the first pawl position after a tensioning of the seat belt and is only brought by the drive motor 3 into the second pawl position during the operation in the seat belt-unrolling direction with the spindle clutch 51 subsequently being disengaged.

The priority application, German Application DE 10-2004-012-166.4, filed on Mar. 9, 2004, including the specification, drawings, claims, and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and sprit of the present invention are to be included as further embodiments of the present invention. The scope of the present invention is to be defined as set forth in the following claims.

What is claimed is:
1. A seat belt tensioner for a seat belt system, comprising:
a seat belt spindle;
a gearwheel connected to the seat belt spindle;
a blocking device comprising a latching pawl for locking the seat belt spindle in a tensioned position by engaging in teeth of the gearwheel; and
a bearing pin,
wherein the blocking device is configured such that the latching pawl can be brought into a first pawl position blocking the gearwheel in a seat belt-unrolling direction by engagement of the latching pawl with the teeth of the gearwheel such that rotation in the seat belt-unrolling direction is prevented until the gearwheel exerts an exertion force on the latching pawl that exceeds a first predetermined force and into a second pawl position blocking the gearwheel in a seat belt-tensioning direction of rotation by engagement of the latching pawl with the teeth of the gearwheel such that rotation in the seat belt-tensioning direction is prevented until the gearwheel exerts an exertion force on the latching pawl that exceeds a second predetermined force, wherein the blocking device is configured to have the latching pawl perform a first pivot-over operation from the first pawl position into the second pawl position when the gearwheel is driven in the seat belt-unrolling direction by a seatbelt extraction force that exceeds a predetermined maximum such that the gearwheel exerts the exertion force on the latching pawl that exceeds the first predetermined force and configured to have the latching pawl perform a second pivot-over operation from the second pawl position into the first pawl position when the gearwheel exerts the exertion force on the latching pawl that exceeds the second predetermined force, wherein the latching pawl is held rotatably on the bearing pin, and wherein the blocking device comprises an elongated hole and the latching pawl is guided on the bearing pin via the elongated hole.

2. The seat belt tensioner according to claim 1, wherein the latching pawl is mounted in a spring-loaded manner whereby the pivoting-over of the latching pawl from the first pawl position into the second pawl position or vice versa can be triggered by a motor force of a drive motor that is connected to the gearwheel.

3. The seat-belt tensioner according to claim 1, wherein the blocking device is configured such that the latching pawl can be deflected radially along a guide slot formed by the elongated hole.

4. The seat belt tensioner according to claim 1, further comprising a mechanical automatic gear that shifts automatically as a function of load.

5. The seat belt tensioner according to claim 4, wherein the automatic gear has a first force transmission path for a first speed with a first transmission ratio and at least one further force transmission path for a second speed with a second transmission ratio that is larger than the first transmission ratio.

6. The seat belt tensioner according to claim 5, wherein the gearwheel is driven by a drive motor and interacts with the first force transmission path and the further force transmission path.

7. The seat belt tensioner according to claim 5, wherein the first force transmission path comprises a sliding clutch that disengages when a predetermined switching-off moment is exceeded, a coupling wheel that connects to the sliding clutch, and a spindle clutch toothed ring that connects to the seat belt spindle and the coupling wheel.

8. The seat belt tensioner according to claim 7, wherein the sliding clutch has a pawl carrier that is mounted rotatably coaxially with the gearwheel and a sliding clutch pawl that is mounted pivotably on the pawl carrier whereby the sliding clutch pawl can be pivoted into a coupling position and into a disengaging position.

9. The seat belt tensioner as claimed in claim 8, wherein the seat belt tensioner is configured such that the sliding clutch pawl couples the pawl carrier and the gearwheel in the seat belt-tensioning direction of rotation in its coupling position, and wherein the seat belt tensioner is configured such that the sliding clutch pawl is ineffective with regard to the coupling between the gearwheel and the pawl carrier in its disengaging position.

10. The seat belt tensioner according to claim 1, wherein the engagement of the latching pawl with the teeth of the gearwheel directly blocks the gearwheel from rotating in the seat belt-unrolling direction in the first pawl position until the gearwheel exerts the exertion force on the latching pawl that exceeds the first predetermined force, and the engagement of the latching pawl with the teeth of the gearwheel directly blocks the gearwheel from rotating in the seat belt-tensioning direction in the second pawl position until the gearwheel exerts the exertion force on the latching pawl that exceeds the second predetermined force.

11. The seat belt tensioner according to claim 1, wherein, when the latching pawl is in the first pawl position and when the gearwheel is driven in the seat belt-unrolling direction by the seatbelt extraction force that exceeds the predetermined maximum, the latching pawl is configured to be pressed away from the gearwheel by the exertion force that exceeds the first predetermined force prior to pivoting in the first pivot-over operation.

12. A seat belt system, comprising:
a seat belt; and
a seat belt tensioner comprising a seat belt spindle; a gearwheel connected to the seat belt spindle; a bearing pin; and a blocking device comprising a latching pawl for locking the seat belt spindle in a tensioned position by engaging in teeth of the gearwheel;

wherein the blocking device is configured such that the latching pawl can be brought into a first pawl position blocking the gearwheel in a seat belt-unrolling direction by engagement of the latching pawl with the teeth of the gearwheel such that rotation in the seat belt-unrolling direction is prevented until the gearwheel exerts an exertion force on the latching pawl that exceeds a first predetermined force and into a second pawl position blocking the gearwheel in a seat belt-tensioning direction of rotation by engagement of the latching pawl with the teeth of the gearwheel such that rotation in the seat belt-tensioning direction is prevented until the gearwheel exerts an exertion force on the latching pawl that exceeds a second predetermined force, wherein the blocking device is configured to have the latching pawl perform a first pivot-over operation from the first pawl position into the second pawl position when the gearwheel is driven in the seat belt-unrolling direction by a seatbelt extraction force that exceeds a predetermined maximum such that the gearwheel exerts the exertion force on the latching pawl that exceeds the first predetermined force and configured to have the latching pawl perform a second pivot-over operation from the second pawl position into the first pawl position when the gearwheel exerts the exertion force on the latching pawl that exceeds the second predetermined force, wherein the latching pawl is held rotatably on the bearing pin, and wherein the blocking device comprises an elongated hole and the latching pawl is guided on the bearing pin via the elongated hole.

13. The seat belt system according to claim 12, wherein the engagement of the latching pawl with the teeth of the gearwheel directly blocks the rotation of the gearwheel in the seat belt-unrolling direction in the first pawl position until the gearwheel exerts the exertion force on the latching pawl that exceeds the first predetermined force and the engagement of the latching pawl with the teeth of the gearwheel directly blocks the rotation of the gearwheel in the seat belt-tensioning direction in the second pawl position until the gearwheel exerts the exertion force on the latching pawl that exceeds the second predetermined force.

14. The seat belt system according to claim 12, wherein, when the latching pawl is in the first pawl position and when the gearwheel is driven in the seat belt-unrolling direction by the seatbelt extraction force that exceeds the predetermined maximum, the latching pawl is configured to be pressed away from the gearwheel by the exertion force that exceeds the first predetermined force prior to pivoting in the first pivot-over operation.

15. A seat belt tensioner for a seat belt system, comprising:
a seat belt spindle;
a gearwheel connected to the seat belt spindle;
a blocking device comprising a latching pawl for locking the seat belt spindle in a tensioned position by engaging in teeth of the gearwheel; and
a bearing pin,
wherein the blocking device is configured such that the latching pawl can be brought into a first pawl position blocking the gearwheel in a seat belt-unrolling direction by engagement of the latching pawl with the teeth of the gearwheel such that rotation in the seat belt-unrolling direction is prevented until the gearwheel exerts an exertion force on the latching pawl that exceeds a first predetermined force caused by a seat belt-extraction force bearing against a shoulder of a vehicle occupant and into a second pawl position blocking the gearwheel in a seat belt-tensioning direction of rotation by engagement of the latching pawl with the teeth of the gearwheel such that rotation in the seat belt-tensioning direction is prevented until the gearwheel exerts an exertion force on the latching pawl that exceeds a second predetermined force,
wherein the blocking device is configured to have the latching pawl perform a first pivot-over operation from the first pawl position into the second pawl position when the gearwheel is driven in the seat belt-unrolling direction by the seatbelt extraction force that has exceeded a predetermined maximum such that the gearwheel exerts the exertion force on the latching pawl that exceeds the first predetermined force and configured to have the latching pawl perform a second pivot-over operation from the second pawl position into the first pawl position when the gearwheel exerts the exertion force on the latching pawl that exceeds the second predetermined force,
wherein the latching pawl is held rotatably on the bearing pin, and
wherein the blocking device comprises an elongated hole and the latching pawl is guided on the bearing pin via the elongated hole.

16. The seat belt tension according to claim 15, wherein the blocking device is configured such that the latching pawl can be deflected radially along a guide slot formed by the elongated hole.

17. The seat belt tensioner according to claim 15, further comprising a mechanical automatic gear that shifts automatically as a function of load.

18. The seat belt tensioner according to claim 17, wherein the automatic gear has a force transmission path for a first speed with a first transmission ratio and at least one further force transmission path for a second speed with a second transmission ratio that is larger than the first transmission ratio.

19. The seat belt tensioner according to claim 15, wherein the engagement of the latching pawl with the teeth of the gearwheel directly blocks the rotation of the gearwheel in the seat belt-unrolling direction in the first pawl position until the gearwheel exerts the exertion force on the latching pawl that exceeds the first predetermined force caused by the seat belt-extraction force bearing against the shoulder of the vehicle occupant and the engagement of the latching pawl with the teeth of the gearwheel directly blocks the rotation of the gearwheel in the seat belt-tensioning direction in the second pawl position until the gearwheel exerts the exertion force on the latching pawl that exceeds the second predetermined force.

20. The seat belt tensioner according to claim 15, wherein, when the latching pawl is in the first pawl position and when the gearwheel is driven in the seat belt-unrolling direction by the seatbelt extraction force that has exceeded the predetermined maximum, the latching pawl is configured to be pressed way from the gearwheel by the exertion force that exceeds the first predetermined force prior to pivoting in the first pivot-over operation.

* * * * *